(12) United States Patent
Sawatari et al.

(10) Patent No.: US 8,130,358 B2
(45) Date of Patent: Mar. 6, 2012

(54) LIQUID CRYSTAL DISPLAY

(75) Inventors: Naoko Sawatari, Tokyo-to (JP); Masato Okabe, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 449 days.

(21) Appl. No.: 12/515,591

(22) PCT Filed: Nov. 19, 2007

(86) PCT No.: PCT/JP2007/072353
§ 371 (c)(1),
(2), (4) Date: May 20, 2009

(87) PCT Pub. No.: WO2008/062744
PCT Pub. Date: May 29, 2008

(65) Prior Publication Data
US 2010/0053525 A1    Mar. 4, 2010

(30) Foreign Application Priority Data

Nov. 24, 2006  (JP) ................. 2006-317394

(51) Int. Cl.
*G02F 1/141* (2006.01)
*G02F 1/1337* (2006.01)
*C09K 19/02* (2006.01)

(52) U.S. Cl. ......... 349/172; 349/123; 349/124; 349/133

(58) Field of Classification Search .......... 349/133, 349/135, 172
See application file for complete search history.

(56) References Cited

U.S. PATENT DOCUMENTS

| | | | |
|---|---|---|---|
| 4,783,148 A | 11/1988 | Tsuboyama et al. | |
| 5,617,229 A | 4/1997 | Yamamoto et al. | |
| 7,326,449 B2 | 2/2008 | Geisow et al. | |
| 7,907,247 B2 * | 3/2011 | Okabe et al. | 349/172 |

(Continued)

FOREIGN PATENT DOCUMENTS

| | | |
|---|---|---|
| JP | 62-182719 A | 8/1987 |
| JP | 62-275223 A | 11/1987 |
| JP | 63-077019 A | 4/1988 |
| JP | 01-105912 A | 4/1989 |
| JP | 7-239485 A | 9/1995 |

(Continued)

OTHER PUBLICATIONS

Yuji Murakami, et al; "Intrinsic Half-V-Mode Ferroelectric Liquid Crystal Displays Fabricated Using Hybrid Alignment Exhibiting High Contrast Ratio and High Reliability without DC Voltage Application to Remove Layer Degeneracy and Their Electro-Optic Characteristics", Jpn. J. Appl. Phys., vol. 42, pp. 2759-2761; May 2003 (exact date not given).

(Continued)

*Primary Examiner* — Michelle R Connelly Cushwa
(74) *Attorney, Agent, or Firm* — Ladas & Parry LLP

(57) ABSTRACT

A liquid crystal display, using a ferroelectric liquid crystal exhibiting mono-stability, which makes it possible to control the direction of the spontaneous polarization of the ferroelectric liquid crystal. The liquid crystal display includes: a first alignment treatment substrate having a first alignment layer which is a rubbed layer; a second alignment treatment substrate having a second alignment layer which is a photo alignment layer using a photo-dimerization type material; and a liquid crystal layer containing a ferroelectric liquid crystal and held between the first alignment treatment substrate and the second alignment treatment substrate. The ferroelectric liquid crystal exhibits mono-stability, and when a negative voltage is applied to a second electrode layer of the second alignment treatment substrate, a molecular direction of the ferroelectric liquid crystal is changed by about 2 times a tilt angle of the ferroelectric liquid crystal parallel to a surface of the substrate.

5 Claims, 8 Drawing Sheets

U.S. PATENT DOCUMENTS

| | | | |
|---|---|---|---|
| 2002/0085153 A1* | 7/2002 | Choi et al. | 349/123 |
| 2009/0051854 A1* | 2/2009 | Okabe et al. | 349/86 |
| 2010/0007832 A1* | 1/2010 | Sawatari et al. | 349/125 |
| 2010/0060844 A1* | 3/2010 | Sawatari et al. | 349/187 |

FOREIGN PATENT DOCUMENTS

| | | |
|---|---|---|
| JP | 2000-010076 A | 1/2000 |
| JP | 2003-005223 A | 1/2003 |
| JP | 2005-208353 A | 8/2005 |
| JP | 2005-234549 A | 9/2005 |
| JP | 2005-234550 A | 9/2005 |
| JP | 2005-258428 A | 9/2005 |
| JP | 2005-258430 A | 9/2005 |
| WO | 2006/123749 A1 | 11/2006 |

OTHER PUBLICATIONS

Toshiaki Nonaka, et al; "Material characteristics of an active matrix LCD based upon chiral smectics", Liquid Crystals, 1999, vol. 26, No. 11, pp. 1599-1602.

J.S. Patel, et al; "Alignment of liquid crystals which exhibit cholesteric to smectic C* phase transitions", J. Appl. Phys. 59(7), Apr. 1, 1986, pp. 2355-2360.

International Search Report; PCT/JP2007/072353.

* cited by examiner

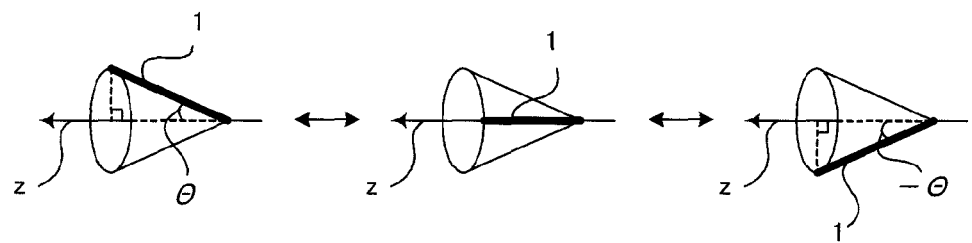
FIG. 1A     FIG. 1B     FIG. 1C
FIG. 2
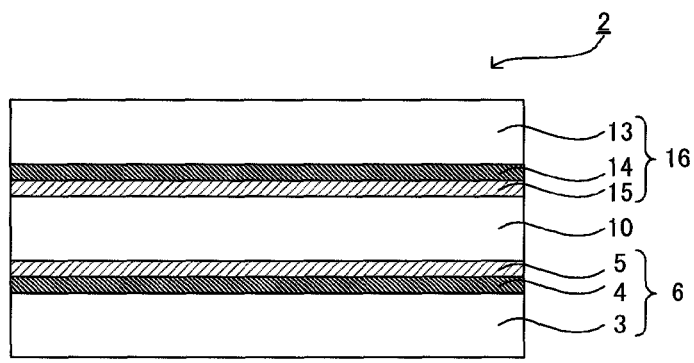
FIG. 3
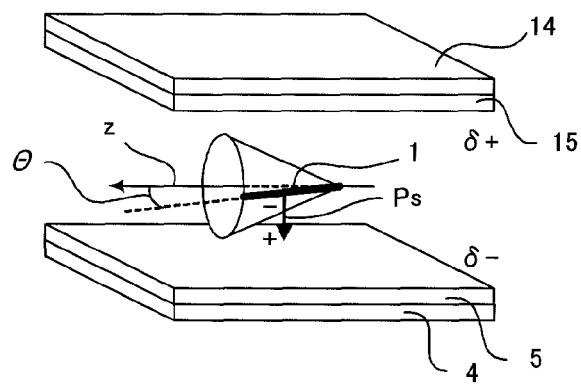

FIG. 9
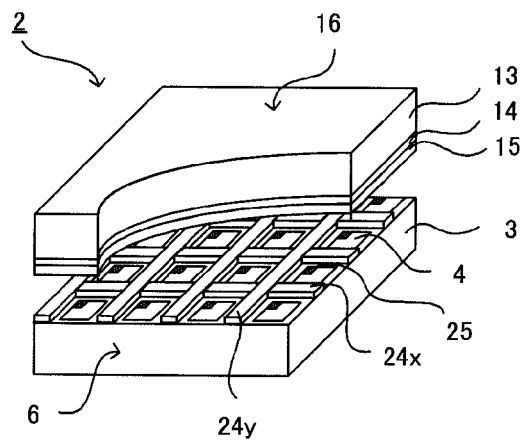
FIG. 10
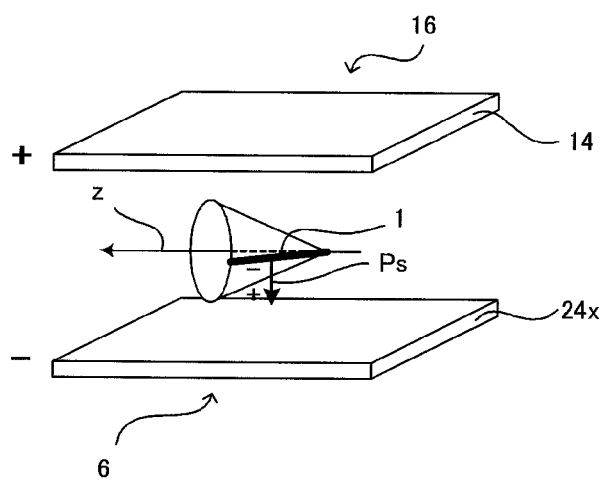
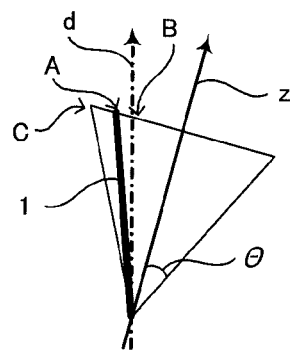
FIG. 11A
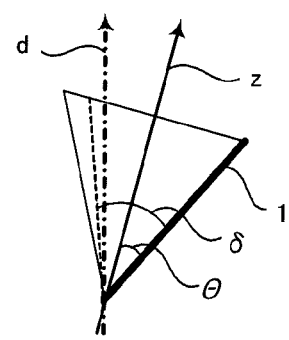
FIG. 11B
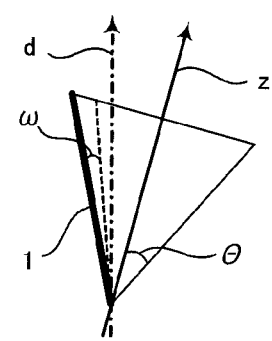
FIG. 11C

LIQUID CRYSTAL DISPLAY

TECHNICAL FIELD

The present invention relates to a liquid crystal display using a mono-stability type ferroelectric liquid crystal having spontaneous polarization.

BACKGROUND ART

Since liquid crystal displays have features of being thin, low in power consumption and others, the use thereof has been expanding in various articles from large-sized displays to portable information terminals and the development thereof has been actively made. Conventionally, for liquid crystal displays, a TN system, an STN multiplex driving system, an active matrix driving system in which thin film transistors (TFTs) are used in TN, and others have been developed and made practicable. However, since nematic liquid crystal is used therein, the response speed of the liquid crystal material is as small as several milliseconds to several tens of milliseconds and it cannot be said that these sufficiently cope with display of moving images.

Ferroelectric liquid crystal (FLC) exhibits a very fast response in order of microseconds, and thus FLC is a liquid crystal suitable for high-speed devices. About ferroelectric liquid crystal, there is well known a bistable liquid crystal which has two stable states when no voltage is applied thereto and is suggested by Clark and Lagerwall (FIG. 14 upper graph). However, the liquid crystal has a problem that the liquid crystal has memory properties but gray scale display cannot be attained since the switching thereof is limited to two states, namely, bright and dark states.

In recent years, attention has been paid to ferroelectric liquid crystal in which the liquid crystal layer thereof is stable in a single state (hereinafter referred to as "monostable") when no voltage is applied thereto as a liquid crystal making it possible to attain gray scale display by the matter that the director (the inclination of the molecule axis) of the liquid crystal is continuously changed by a change in applied voltage so as to analogue-modulate the light transmission thereof (Non-Patent Document 1, FIG. 14 lower graphs). As the liquid crystal showing the mono-stability, ferroelectric liquid crystals having the phase change of cholesteric phase (Ch)-chiral smectic C phase (SmC*) without the transition to the smectic A (SmA) phase in the temperature lowering process are generally used (FIG. 13 upper part).

On the other hand, as the ferroelectric liquid crystal, there is a material having the phase change of cholesteric phase (Ch)-smectic A phase (SmA)-chiral smectic C phase (SmC*) so as to show the SmC* phase via the SmA phase in the temperature lowering process (FIG. 13 lower part). Among the ferroelectric liquid crystal material reported so far, most of them are those having the latter phase sequence of passing through the SmA phase compared with the former material which does not pass the SmA phase. It is known that the latter ferroelectric liquid crystal having the phase sequence of passing through SmA phase in general has two stable states with respect to one layer normal line so as to show the bi-stability.

In recent years, color liquid crystal displays have been actively developed. The method for realizing color display is generally classified into a color filter system and a field sequential color system. The color filter system is a system of using a white light source as a back light and attaching a micro color filter in R, G or B color to each pixel, thereby realizing color display. On the other hand, the field sequential color system is a system of switching a back light into R, G, B, R, G, B . . . with time, and opening and shutting a black and white shutter of a ferroelectric liquid crystal in synchronization therewith to mix the colors with time by afterimage effect on the retina, thereby realizing color display. This field sequential color system makes it possible to attain color display in each pixel, and does not require any color filter low in transmission. As a result, this system is useful since the system is capable of attaining bright and highly precise color display and realizing low power consumption and low costs.

The field sequential color system is a system in which each pixel is subjected to time sharing; it is therefore necessary for the liquid crystal as the black and white shutter to have high speed response properties in order to give good moving image display properties. If ferroelectric liquid crystal is used, this problem can be solved. The ferroelectric liquid crystal used at this time is, in particular, desirably a liquid crystal exhibiting mono-stability in order to make gray scale display based on analogue modulation possible and realize highly precise color display, as described above. As the ferroelectric liquid crystal exhibiting mono-stability, there are a ferroelectric liquid crystal which responds to both of plus-polarized and minus-polarized voltages (FIG. 14 right lower graph) and a ferroelectric liquid crystal which responds only to either of plus- or minus-polarized voltage (FIG. 14 left lower graph). When a ferroelectric liquid crystal is driven by using a thin film transistor (TFT) element, it is particularly preferable to use the ferroelectric liquid crystal which responds only to either of plus- or minus-polarized voltage since effect of inversion current generated by spontaneous polarization is less.

Herein, FIG. 15 shows an example of a driving sequence of a liquid crystal display based on a field sequential color system using a TFT element. In FIG. 15, it is supposed that the voltage applied to the liquid crystal display is set into the range of 0 to ±V (V), data-writing scanning is attained through a plus-polarized voltage, and data-erasing scanning is attained through a minus-polarized voltage. It is also supposed that a ferroelectric liquid crystal used exhibits mono-stability and responds to only either of plus- or minus-polarized voltage.

As illustrated in FIGS. 12A and 12B, the response of the ferroelectric liquid crystal which exhibits mono-stability and responds to only either of plus or minus-polarized voltage is classified to a case that the liquid crystal gives a response to a plus-polarized voltage to turn into a bright state (FIG. 12A), and a case that the liquid crystal gives a response to a minus-polarized voltage to turn into a bright state (FIG. 12B). As illustrated in FIG. 15, therefore, in the case of using the ferroelectric liquid crystal exhibiting the response illustrated in FIG. 12A (liquid crystal response 1), the liquid crystal turns into a bright state when a plus-polarized voltage is applied thereto. In the case of using the ferroelectric liquid crystal exhibiting the response illustrated in FIG. 12B (liquid crystal response 2), the liquid crystal turns into a bright state when a minus-polarized voltage is applied thereto.

The ferroelectric liquid crystal using a TFT element is driven by applying a certain voltage to a common electrode of a common electrode substrate facing to a TFT substrate and by applying a voltage to a pixel electrode of each pixel in the TFT substrate. Here, the application of a plus-polarized denotes to a case when the voltage applied to the pixel electrode is relatively higher than the voltage applied to the common electrode, and the application of a minus-polarized voltage denotes to a case when the voltage applied to the pixel electrode is relatively lower than the voltage applied to the common electrode.

When the ferroelectric liquid crystal which responds only to a plus-polarized voltage is used as a ferroelectric liquid crystal, an application of plus-polarized voltage (writing) and an application of minus-polarized voltage (erasing) are conducted in turn to strike a balance in charges. When a TFT element is used to drive a ferroelectric liquid crystal, voltages cannot be written into all the pixels simultaneously and scanning is performed in after another line. Thus, when scanning is performed from a first line to an $L^{th}$ line, a time gap is generated between the writing scanning. Time gap is also generated in erasing scanning. In an example shown in FIG. 15, erasing scanning starts from a first line after all the writing scanning are completed.

Further, in a field sequential color system, writing scanning and erasing scanning are performed in synchronization with the flashing of the used back light. In FIG. 15, "+(R)" represents a matter that writing scanning (the application of a plus-polarized voltage) is performed in synchronization with a red (R) back light, and "−(R)" represents a matter that erasing scanning (the application of a minus-polarized voltage) is performed in synchronization with the red (R) back light. Similarly, "+(G)", "−(G)", "+(B)", and "−(B)" represent matters that the scanning operations are performed in synchronization with a green (G) back light and a blue (B) back light, respectively.

As described above, in a field sequential color system, writing scanning and erasing scanning are performed in synchronization with the switching of the used back light into R, G, B, . . . with time, thereby causing the ferroelectric liquid crystal to respond. Accordingly, when scanning is performed in synchronization with the back light R, the liquid crystal turns into a bright state during the lighting of the back light R in each of the writing scanning (+(R)) on the first line and the writing scanning (+(R)) on the $L^{th}$ line in the case of using the ferroelectric liquid crystal exhibiting the liquid crystal response 1. On the other hand, in the case of using the ferroelectric liquid crystal exhibiting the liquid crystal response 2, a time gap is generated in writing scanning (+(R)) and erasing scanning (−(R)) between the first line and the $L^{th}$ line. Accordingly, by the erasing scanning (−(R)) on the $L^{th}$ line in synchronism with the back light R, the liquid crystal turns unfavorably into a bright state when the back light G lights (broad line frames in FIG. 15). When scanning is performed in synchronization with the back light G, erasing scanning (−(G)) on the $L^{th}$ line in synchronization with the back light G causes the following: the liquid crystal turns unfavorably into a bright state when the back light B lights (broad line frames in FIG. 15).

In FIG. 15, "Bright (R)" represents a matter that the liquid crystal turns into a bright state by scanning in synchronization with the back light R (red), and "Dark" represents a matter that the liquid crystal turns into a dark state by scanning in synchronization with each of the back light R (red), G (green) and B (blue). In the same manner, "Bright (G)" and "Bright (B)" represent matters that the liquid crystal turns into a bright state by scanning in synchronization with the back lights G (green) and B (blue), respectively.

In common liquid crystal display devices, it is generally decided that writing scanning and erasing scanning are each performed by either one of plus-polarized and minus-polarized voltages and cannot be changed easily; therefore, in order to avoid the above-mentioned problems, it is necessary to adjust the polarity of the voltage to which the ferroelectric liquid crystal exhibiting mono-stability responds to the polarity of the voltage applied. This response of the ferroelectric liquid crystal is decided by the direction of spontaneous polarization of the ferroelectric liquid crystal. Therefore, the polarity of the voltage to which the ferroelectric liquid crystal responds can be controlled if the direction of the spontaneous polarization can be controlled.

Ferroelectric liquid crystal has a higher molecule order than nematic liquid crystal, so as not to be aligned with ease. In particular, in ferroelectric liquid crystal which does not pass SmA phase, two domains different in the layer normal line direction (referred to as the "double domains" hereinafter) are generated (the upper part in FIG. 13). In such double domains, white-black reversed display is generated when the liquid crystal is driven. This becomes a serious problem. For this reason, various alignment treatments are being investigated.

As a method for overcoming the double domains, known is, for example, the electric field induced technique of heating a liquid crystal cell to a temperature not lower than the cholesteric phase, and cooling the liquid crystal cell gradually while applying a DC voltage thereto (see Non-Patent Document 2). When this electric field induced technique is used, the direction of the spontaneous polarization can be controlled in accordance with the direction of the applied electric field. According to this method, however, if the temperature is raised again to the phase transition point or higher, alignment disorder is generated. Moreover, manufacturing process becomes complicated and there is caused a problem such as that alignment disorder is generated in the region on which the electric field does not act between pixel electrodes.

As a method to mono-stabilize a ferroelectric liquid crystal, a method of using photo alignment layer as the upper and lower alignment layers, wherein a material having different composition is used for each of the photo alignment layers, is proposed (Patent Documents 1-3). The reasons of obtaining a good alignment state by employing a material having different composition for the each of the upper and lower photo alignment layers are not clear, but it is thought to be a difference in interaction between the respective photo alignment layer and the ferroelectric liquid crystal. A direction of spontaneous polarization of liquid crystal display obtained by such a method, however, cannot be known until the liquid crystal display is actually driven.

As another method to mono-stabilize a ferroelectric liquid crystal, a method, wherein a reactive liquid crystal is coated to either of the upper and lower alignment layers to align and fix the liquid crystal, and a fixed liquid crystal layer (reacted liquid crystal layer) is formed to make the fixed liquid crystal layer act as an alignment layer, is proposed (Patent Document 4). In this method, since the structure of a reactive liquid crystal is relatively similar to that of a ferroelectric liquid crystal, an interaction between the alignment layer and the ferroelectric liquid crystal becomes strong. Thus, an alignment of liquid crystal can be controlled more effectively than a case of using only photo alignment layers, and the ferroelectric liquid crystal can be aligned without causing alignment defects such as double domains by forming a fixed liquid crystal layer to either of the upper and lower alignment layers. However, a direction of spontaneous polarization of liquid crystal display obtained by such a method cannot also be known until it is actually driven.

Patent Document 1: Japanese Patent Application Publication 2005-208353
Patent Document 2: Japanese Patent Application Publication 2005-234549
Patent Document 3: Japanese Patent Application Publication 2005-234550
Patent Document 4: Japanese Patent Application Publication 2005-258428

Non-Patent Document 1: NONAKA, T., LI, J., OGAWA, A., HORNUNG, B., SCHMIDT, W., WINGEN, R., and DUBAL, H., 1999, Liq. Cryst., 26, 1599.

Non-Patent Document 2: PATEL, J., and GOODBY, J. W., 1986, J. Appl. Phys., 59, 2355.

DISCLOSURE OF THE INVENTION

Problems to be Solved by the Invention

The present invention has been made in light of the above-mentioned problems, and a main object thereof is to provide a liquid crystal display, using a ferroelectric liquid crystal exhibiting mono-stability, which makes it possible to control the direction of the spontaneous polarization of the ferroelectric liquid crystal.

Means for Solving the Problems

To attain the above-mentioned object, the present invention provides a liquid crystal display comprising: a first alignment treatment substrate having a first substrate, a first electrode layer formed on the first substrate, and a first alignment layer which is formed on the first electrode layer and which is a rubbed layer; and a second alignment treatment substrate having a second substrate, a second electrode layer formed on the second substrate, a second alignment layer which is formed on the second electrode layer and which is a photo alignment layer using a photo-dimerization type material to impart anisotropy to an alignment layer by generating a photo-dimerization reaction; and a ferroelectric liquid crystal held between the first alignment layer of the first alignment treatment substrate and the second alignment layer of the second alignment treatment substrate; in which the first alignment layer of the first alignment treatment substrate and the second alignment layer of the second alignment treatment substrate are provided to face each other, characterized in that the ferroelectric liquid crystal exhibits mono-stability, and further characterized in that, when a negative voltage is applied to the second electrode layer, a molecular direction of the ferroelectric liquid crystal is changed by about 2 times a tilt angle of the ferroelectric liquid crystal parallel to a surface of the first alignment treatment substrate.

According to the present invention, between the first alignment layer which is a rubbed layer and the second alignment layer which is a photo alignment layer using a photo-dimerization type material, the spontaneous polarization of the ferroelectric liquid crystal tends direct to the side of the first alignment layer which is the rubbed layer. By utilizing such tendency, it is possible to control the direction to where the spontaneous polarization of the ferroelectric liquid crystal directs and mono-stabilize the alignment of the ferroelectric liquid crystal. Thereby, problems such as disclosed in the above-mentioned "Background Art" can be avoided.

In the present invention, it is preferable that the rubbed layer contains polyimide.

In the present invention, it is preferred that the first alignment treatment substrate is a TFT substrate having a thin film transistor (TFT) formed on the first substrate and the second alignment treatment substrate is a common electrode substrate in which the second electrode layer is a common electrode. Such a structure makes it possible to prevent light leakage near the gate electrode when the switch of the TFT elements is turned off.

The liquid crystal display in the present invention is preferably driven by an active matrix system using a thin film transistor. This is because the adoption of the active matrix system using TFT elements makes it possible to switch on or off the target pixels surely to give high-quality display.

Moreover, the liquid crystal display of the present invention is preferably displayed by a field sequential color system. This is because the ferroelectric liquid crystal shows mono-stability and enables gray scale display, and also because a highly precise, low-power consumption and low cost display of color moving images with a wide viewing angle can be realized by displaying the field sequential color system.

Effects of the Invention

In the present invention, a rubbed layer is used for the first alignment layer and a photo alignment layer using a photo-dimerization type material is used for the second alignment layer. By utilizing a tendency that the spontaneous polarization of ferroelectric liquid crystal directs to the first alignment layer which is the rubbed layer, the present invention can achieve an effect of being able to control the direction of spontaneous polarization of the ferroelectric liquid crystal.

BRIEF DESCRIPTION OF THE DRAWINGS

FIGS. 1A to 1C are each a schematic diagram showing the behavior of the liquid crystal molecule.

FIG. 2 is a schematic sectional view illustrating one example of the liquid crystal display of the present invention.

FIG. 3 is a schematic view illustrating an example of the alignment state of a ferroelectric liquid crystal.

FIG. 9 is a schematic sectional view illustrating another example of the liquid crystal display of the present invention.

FIG. 10 is a schematic view illustrating another example of the alignment state of a ferroelectric liquid crystal.

FIGS. 11A to 11C are each a schematic view illustrating another example of the alignment state of a ferroelectric liquid crystal.

EXPLANATION OF REFERENCE

Figure 4:
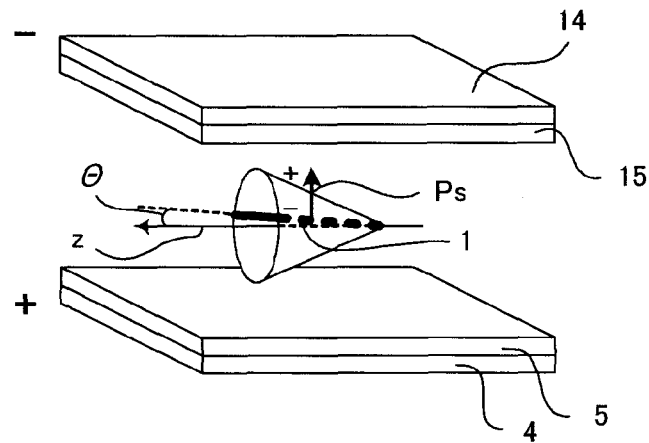
FIG. 4 is a schematic view illustrating another example of the alignment state of a ferroelectric liquid crystal.

1: liquid crystal molecule
2: liquid crystal display
3: first substrate
4: first electrode layer
5: first alignment layer 6: first alignment treatment substrate
10 liquid crystal layer
13: second substrate
14: second electrode layer
15: second alignment layer
16: second alignment treatment substrate
z: layer normal line
Ps: spontaneous polarization
θ: tilt angle

BEST MODE FOR CARRYING OUT THE INVENTION

The inventors conducted the below-mentioned experiments to research directions of spontaneous polarization of ferroelectric liquid crystals.

First, a liquid crystal display wherein a ferroelectric liquid crystal is held between a rubbed layer and a photo alignment layer which uses a photo-dimerization type material was manufactured.

Alignment layers were prepared by printing polyimide (manufactured by NISSAN CHEMICAL INDUSTRIES, LTD, trade name: SE-5291) on two glass substrates, each of which has an ITO electrode formed, and by conducting a rubbing treatment thereon. A 2% by mass solution of a photo-dimerization type material (manufactured by Rolic Technologies Ltd., trade name: ROP 103,) in cyclopentanone was spin-coated onto the glass substrates with the ITO electrodes formed. The resultants were dried at 130° C. for 15 minutes, and were then exposed to polarized ultraviolet rays at 100 mJ/cm$^2$ to conduct an alignment treatment.

Bead spacers 1.5 μm in size were scattered onto one of the substrates and s sealing material was coated onto the other substrate with a seal dispenser. The substrates were provided to face each other so that the direction of the respective alignment treatment conducted on each of substrate becomes parallel to each other, and then the substrates were thermally compressed onto each other to manufacture an empty liquid crystal cell.

A ferroelectric liquid crystal (manufactured by AZ Electronic Materials, trade name "R2301") was caused to adhere onto the upper part of the injecting opening. An oven was used to inject the liquid crystal at a temperature higher than the N phase/isotropic phase transition temperature by 10 to 20° C., and the temperature was slowly returned to room temperature.

When a negative voltage was applied to the electrode of the second alignment treatment substrate, the molecular direction of the ferroelectric liquid crystal was changed by about 2 times the tilt angle. The ratio of the molecules of the ferroelectric liquid crystal in which the molecular directions were changed by about 2 times the tilt angle was approximately 83% of all the molecules.

Liquid crystal displays, each in which a ferroelectric liquid crystal was held between a rubbed layer and a photo alignment layer using a photo-dimerization type material in the same manner as described above were produced while varying the kind of polyimide, the kind of the photo-dimerization type material, or a combination thereof. As a result, the same results as described above were obtained.

Next, another liquid crystal display was formed, in which a ferroelectric liquid crystal was held between a pair of photo alignment layers, each of which uses a photo-dimerization type material.

A 2% by mass solution of a photo-dimerization type material (manufactured by Rolic Technologies Ltd., trade name: ROP 103,) in cyclopentanone was respectively spin-coated onto the two glass substrates with the ITO electrodes formed. The resultants were dried at 130° C. for 15 minutes, and were then exposed to polarized ultraviolet rays at 100 mJ/cm$^2$ to conduct an alignment treatment.

Bead spacers 1.5 μm in size were scattered onto one of the substrates and s sealing material was coated onto the other substrate with a seal dispenser. The substrates were provided to face each other so that the direction of the respective alignment treatment conducted on each of substrate becomes parallel to each other, and then the substrates were thermally compressed onto each other to manufacture an empty liquid crystal cell.

A ferroelectric liquid crystal (manufactured by AZ Electronic Materials, trade name "R2301") was caused to adhere onto the upper part of the injecting opening. An oven was used to inject the liquid crystal at a temperature higher than the N phase/isotropic phase transition temperature by 10 to 20° C., and the temperature was slowly returned to room temperature.

When a negative voltage was applied to the electrode of one substrate, the molecular directions of part of the ferroelectric liquid crystals were changed by about 2 times the tilt angle. However, the molecular directions of some ferroelectric liquid crystals were not changed. The ratio of the molecules of the ferroelectric liquid crystal in which the molecular directions were changed by about 2 times the tilt angle was approximately 50% of all the molecules.

Liquid crystal displays, each in which a ferroelectric liquid crystal was held between a pair of rubbed layers in the same manner as described above were produced. As a result, the same results as described above were obtained.

The inventors have found out from the above-mentioned results of the experiments that spontaneous polarization of ferroelectric liquid crystal tends to direct to the side of the rubbed layer when a rubbed layer is used as an alignment layer and a photo alignment layer using a photo-dimerization type material is used as the other alignment layer.

Hereinafter, a liquid crystal display of the present invention will be explained in detail.

The liquid crystal display of the present invention comprises: a first alignment treatment substrate having a first substrate, a first electrode layer formed on the first substrate, and a first alignment layer which is formed on the first electrode layer and which is a rubbed layer; and a second alignment treatment substrate having a second substrate, a second electrode layer formed on the second substrate, a second alignment layer which is formed on the second electrode layer and which is a photo alignment layer using a photo-dimerization type material to impart anisotropy to an alignment layer by generating a photo-dimerization reaction; and a ferroelectric liquid crystal held between the first alignment layer of the first alignment treatment substrate and the second alignment layer of the second alignment treatment substrate; in which the first alignment layer of the first alignment treatment substrate and the second alignment layer of the second alignment treatment substrate are provided to face each other, characterized in that the ferroelectric liquid crystal exhibits mono-stability, and further characterized in that, when a negative voltage is applied to the second electrode layer, a molecular direction of the ferroelectric liquid crystal is changed by about 2 times a tilt angle of the ferroelectric liquid crystal parallel to a surface of the first alignment treatment substrate.

As mentioned, the ferroelectric liquid crystal used in the present invention exhibits mono-stability, and a molecular direction of the ferroelectric liquid crystal is changed by about 2 times a tilt angle of the ferroelectric liquid crystal parallel to a surface of the first alignment treatment substrate when a negative voltage is applied to the second electrode layer.

As shown in FIGS. 1A to 1C, in the ferroelectric liquid crystal, each of the liquid crystal molecules 1 is inclined from a layer normal line z, and rotates along the edge line of a cone having a bottom plane perpendicular to the layer normal line z. In this cone, the inclination angle of the liquid crystal molecules 1 to the layer normal line z is defined as the tilt angle $\theta$.

The wording "exhibiting mono-stability" means that the state of a ferroelectric liquid crystal is stabilized in a single state when no voltage is applied thereto. Specifically, as illustrated in FIGS. 1A to 1C, each of the liquid crystal molecules 1 can move on the cone between two states that the molecule is inclined by tilt angles of $\pm\theta$ to the layer normal line z; the wording means that the liquid crystal molecule 1 is stabilized in any one state between the states on the cone when no voltage is applied thereto.

With reference to the drawings, the liquid crystal display of the present invention will be explained.

FIG. 2 is a schematic sectional view illustrating an example of the liquid crystal display of the invention. In the liquid crystal display illustrated in FIG. 2, a first alignment treatment substrate 6 in which a first electrode layer 4 and a first alignment layer 5 are successively formed on a first substrate 3, and a second alignment treatment substrate 16 in which a second electrode layer 14, a second alignment layer 15 are successively formed on a second substrate 13 are facing each other, and a ferroelectric liquid crystal is held between the first alignment layer 5 of the first alignment treatment substrate 6 and the second alignment layer 15 of the second alignment treatment substrate 16 to constitute a liquid crystal layer 10. The first alignment layer 5 is a rubbed layer and the second alignment layer 15 is a photo alignment layer using a photo-dimerization type material. Further, the first alignment layer 5 and the second alignment layer 15 are provided to make alignment treatment directions of the individual layers parallel to each other.

From the above-mentioned results of the experiments, it has been found out that spontaneous polarization of the ferroelectric liquid crystal tends to direct to the side of the first alignment layer which is the rubbed layer, when a rubbed layer is used for the first alignment layer and a photo alignment layer using a photo-dimerization type material is used as the second alignment layer. The reason of the above is thought to be an effect of a polar surface interaction, which is an interaction between the ferroelectric liquid crystal, and the first alignment layer surface and second alignment layer surface.

An example of the alignment state of the ferroelectric liquid crystal used in the present invention is shown in FIG. 3. According to the above-mentioned results of the experiments, the second alignment layer posses a tendency to have a stronger plus polarity when the first alignment layer which is a rubbed layer and the second alignment layer which is a photo alignment layer using a photo-dimerization type material are compared. As shown in FIG. 3, polar surface interaction makes the spontaneous polarization Ps of the liquid crystal molecule 1 to have a tendency to be directed to the side of the first alignment layer 5 when no voltage is applied. In FIG. 3, the first substrate and the second substrate are omitted and the liquid crystal molecule shows the ferroelectric liquid crystal.

As illustrated in FIG. 4, when the positive voltage is applied to the first electrode layer 4 and the negative voltage to the second electrode layer 14, the spontaneous polarization Ps of the liquid crystal molecules 1 is directed to the side of the second alignment layer 15 by the effect of the polarity of the applied voltage. In FIG. 4, the first substrate and the second substrate are omitted.

Furthermore, when a negative voltage is applied to the first electrode layer and a positive voltage to the second electrode layer, the spontaneous polarization Ps of the liquid crystal molecules 1 is directed to the side of the first alignment layer 5 by the effect of the polarity of the applied voltage, as illustrated in FIG. 3. In this case, the liquid crystal molecules turn into the same alignment state as in the non-voltage-applying state.

The direction of spontaneous polarization become directed to the direction mentioned-above is because the direction of spontaneous polarization is directed to a direction where polarization of the ferroelectric liquid crystal and polarization of the alignment layer or polarity of the voltage applied strike an electrical balance so that the liquid crystal molecule are made in an electrically stable state.

Figure 5:
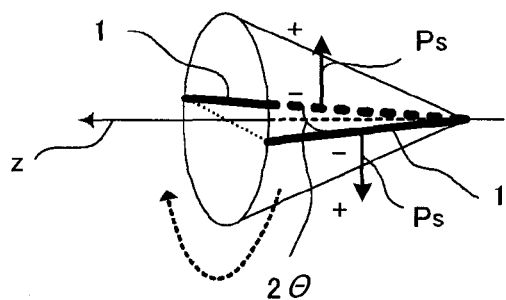
FIG. 5 is a schematic view illustrating the spontaneous polarization of a ferroelectric liquid crystal.

When the liquid crystal display is made from the non-voltage-applying state or the state when the positive voltage is applied to the second electrode layer (FIG. 3) to the state when the minus voltage is applied to the second electrode layer (FIG. 4), the liquid crystal molecule 1 is rotated by an angle of about $2\theta$, as illustrated in FIG. 5, by repulsion between the minus polarity of this applied voltage and the minus polarity of the spontaneous polarization of the liquid crystal molecule. In other words, when a negative voltage is applied to the second electrode layer, the molecular direction of the ferroelectric liquid crystal is changed to parallel to the first alignment treatment substrate surface by about 2 times the tilt angle $\theta$ of the ferroelectric liquid crystal.

As described above, in the present invention, the direction of the spontaneous polarization of the liquid crystal molecule can be controlled by utilizing the tendency that the spontaneous polarization of the ferroelectric liquid crystal directs to the side of the first alignment layer.

Figure 6A:
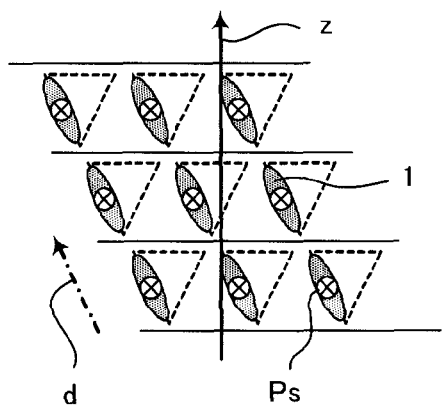
FIGS. 6A and 6B are each a schematic view illustrating another example of the alignment state of a ferroelectric liquid crystal.
Figure 6B:
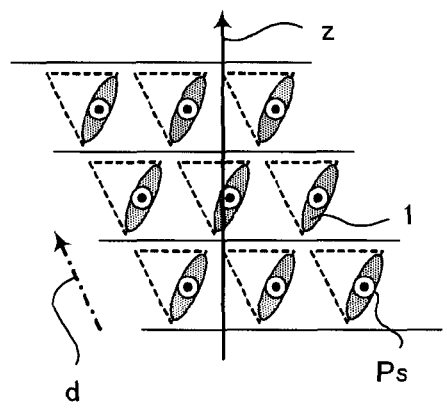

Generally, in the liquid crystal displays, two alignment layers which face to each other are provided to make the alignment treatment directions of the individual layers face to each other. For example, in the liquid crystal display device shown in FIG. 2, liquid crystal molecules 1 align along the alignment treatment direction "d" of the first alignment layer and the second alignment layer as shown in FIG. 6A, and they become in a uniform alignment state. When the positive voltage is applied to the first electrode layer and the negative voltage to the second electrode layer, the spontaneous polarization Ps repels by the effect of the polarity of the applied voltage as illustrated in FIG. 6B. In this case, the liquid crystal display molecules 1 become in a uniform alignment state. Furthermore, when a negative voltage is applied to the first electrode layer and a positive voltage to the second electrode layer, the spontaneous polarization Ps repels by the effect of the polarity of the applied voltage, as illustrated in FIG. 6A. In this case, the liquid crystal molecules 1 turn into the same alignment state as in the non-voltage-applying state. FIG. 6A is a schematic view illustrating the alignment state of the liquid crystal molecules from the top side in FIG. 3, in which the spontaneous polarization Ps is directed from the front side of the drawing paper to the back side of the drawing paper (x marks in FIG. 6A). FIG. 6B is a schematic view illustrating the alignment state of the liquid crystal molecules from the top side in FIG. 4, in which the spontaneous polarization Ps is directed from the back side of the drawing paper to the front side of the drawing paper (● marks in FIG. 6B).

In the present invention, since the direction of the spontaneous polarization can be controlled as mentioned above, no alignment defect is caused and alignment of the ferroelectric liquid crystal can be mono-stabilized. In other words, the ferroelectric liquid crystal exhibits mono-stability. Further, since the ferroelectric liquid crystal can be aligned without using the electric field induced technique, alignment of the ferroelectric liquid crystal can be maintained even if the temperature thereof rises to the phase transition temperature or higher, and thereby has an advantage of restraining the generation of alignment defects.

When a negative voltage is applied to the second electrode layer, the percentage of the ferroelectric liquid crystal molecules in which the molecular direction thereof is changed by about 2 times the tilt angle is preferably 70% or more, more preferably 80% or more, further more preferably 90% or more, and most preferably 95% or more. When the percentage is in the above-mentioned range, a good contrast ratio can be obtained.

Figure 7:
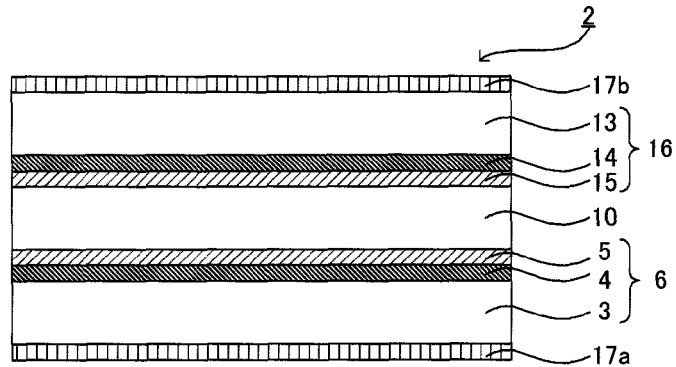
FIG. 7 is a schematic sectional view illustrating another example of the liquid crystal display of the present invention.

The above-mentioned percentage can be measured as follows:

As illustrated in, for example, FIG. 7, the liquid crystal display comprises: the first alignment treatment substrate 6 having the first electrode layer 4 and the first alignment layer 5 laminated on the first substrate 3; a second alignment treatment substrate 16 having the second electrode layer 14 and the second alignment layer 15 laminated on the second substrate 13; and the liquid crystal layer 10 containing ferroelectric liquid crystal, in which the liquid crystal layer 10 is held between the first alignment treatment substrate 6 and the second alignment treatment substrate 16. Polarizing plates 17a and 17b are set up outside the first alignment treatment substrate 6 and the second alignment treatment substrate 16, respectively, and light is caused to go into the side of the polarizing plate 17a and caused to go out from the side of the polarizing plate 17b. The two polarizing plates 17a and 17b are provided to make the polarizing axes of the individual plates substantially perpendicular to each other and further make the polarizing axis of the polarizing plate 17a substantially parallel to the alignment treatment direction (the alignment direction of the liquid crystal molecules) of the first alignment layer 5.

In a non-voltage-applying state, the linearly polarized light transmitted through the polarizing plate 17a is consistent with the alignment direction of the liquid crystal molecules; therefore, the refractive index anisotropy of the liquid crystal molecules is not expressed so that the linearly polarized light transmitted through the polarizing plate 17a, as it is, passes through the liquid crystal molecules and is then intercepted by the polarizing plate 17b. As a result, the liquid crystal display turns into a dark state. On the other hand, in a voltage-applying state, the liquid crystal molecules move on the cones so that the linearly polarized light transmitted through the polarizing plate 17a and the alignment direction of the liquid crystal molecules come to have a predetermined angle. Accordingly, the linearly polarized light transmitted through the polarizing plate 17a is turned to elliptically polarized light by the birefringence of the liquid crystal molecules. Out of rays of this elliptically polarized light, only linearly polarized light consistent with the polarizing axis of the polarizing plate 17b is transmitted through the polarizing plate 17b, so that the liquid crystal display turns into a bright state.

For this reason, in the case that a negative voltage is applied to the second electrode layer, a bright state is obtained when the molecular direction of the ferroelectric liquid crystal is changed by about 2 times the tilt angle. On the other hand, in the case that a negative voltage is applied to the second electrode layer, for example, the ferroelectric liquid crystal molecules having a molecular direction not changed are partially present in some case. In this case, a dark state is partially obtained. Accordingly, from the area ratio between the black and the white in a black and white (dark and bright) display obtained at the time of the application of a voltage, the ratio of the ferroelectric liquid crystal molecules where their molecular direction is changed by about 2 times the tilt angle when a negative voltage is applied to the first electrode can be calculated.

As described above, in the liquid crystal display in which the polarizing plates are set up, a dark state is generated in a non-voltage-applying state and in the state when a minus voltage is applied to the first electrode layer; while a bright state is generated in the state when a positive voltage is applied to the first electrode layer. Accordingly, when the liquid crystal display is displayed by a field sequential color system, the generation of a bright state can be avoided, for example, by scanning in synchronization with a back light R (red) when a back light G (green) lights on, as illustrated in FIG. 8.

Figure 8:
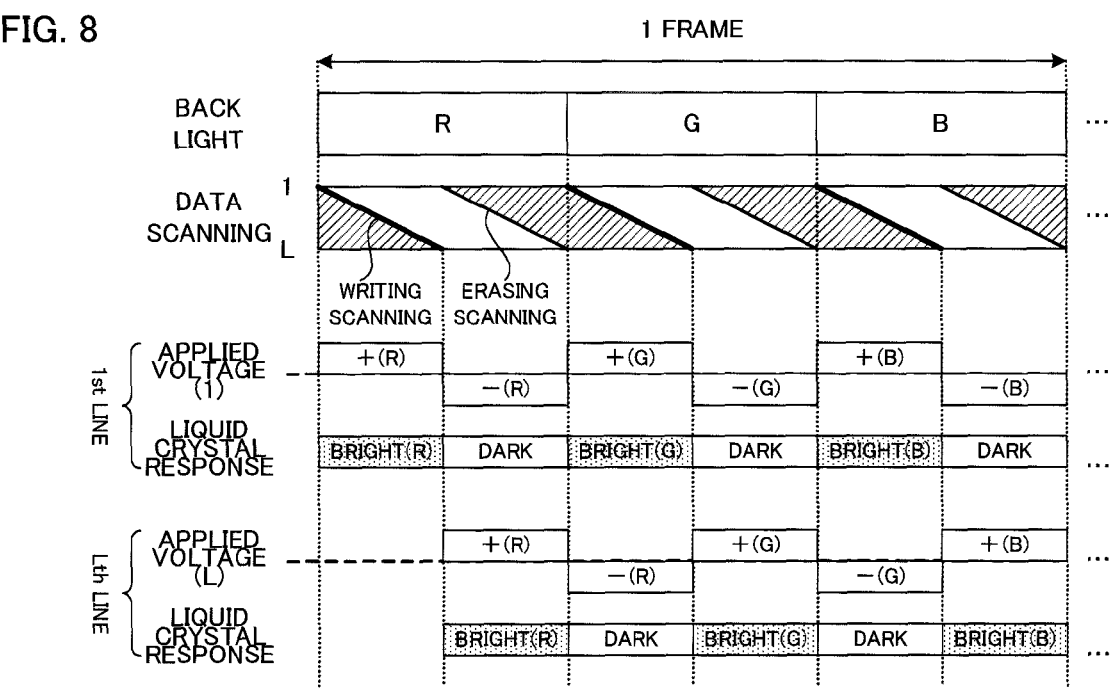
FIG. 8 is a conceptual diagram illustrating a driving sequence of a liquid crystal display based on a field sequential color system.
Figure 15:
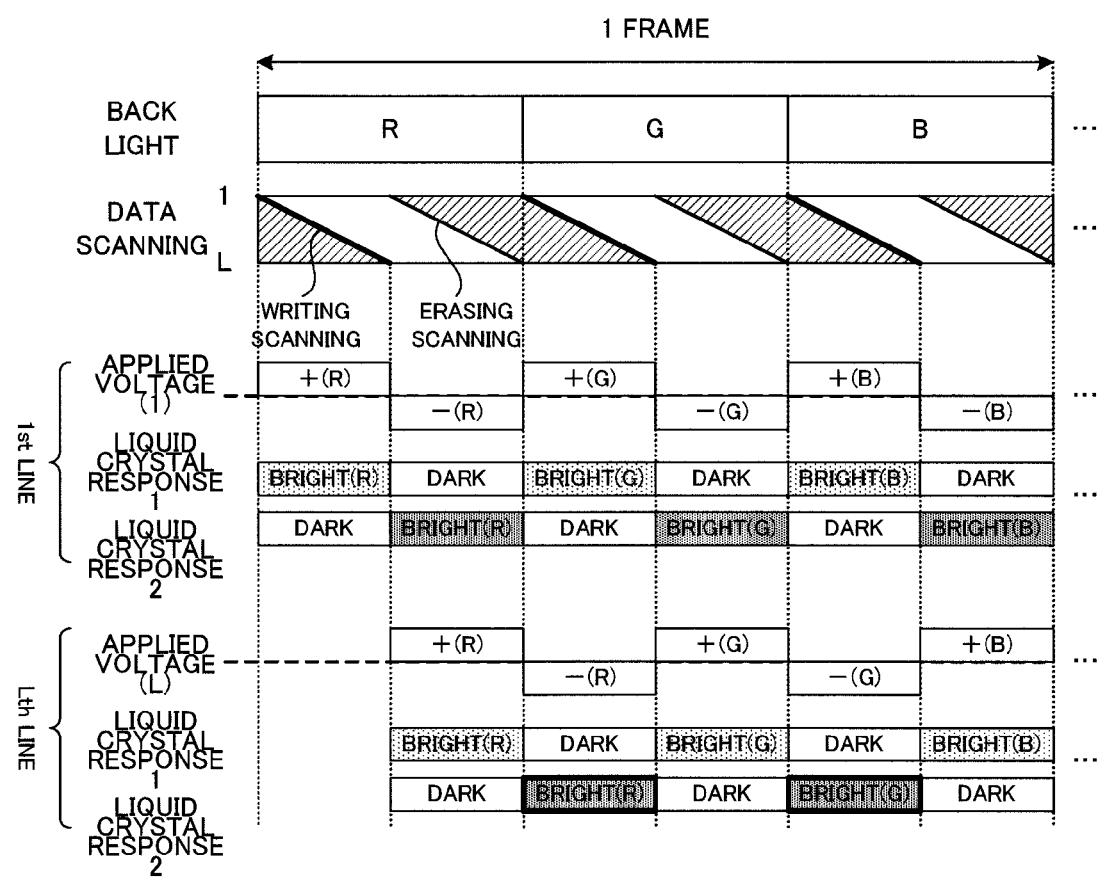
FIG. 15 is a conceptual diagram illustrating a driving sequence of a liquid crystal display based on a field sequential color system

Symbols and so on in FIG. 8 are the same as described in FIG. 15.

In general, the ferroelectric liquid crystal having the phase sequence passing through SmA phase has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. It is effective to enlarge the pretilt angle to prevent the generation of such zigzag defect or the hairpin defect.

In general, rubbed layers can realize a larger pretilt angle compare to that of photo alignment layers. Therefore, by using rubbed layers, generation of zigzag defect or the hairpin defect can be restrained.

Further, since photo alignment layers are applied with the photo alignment treatment and the photo alignment treatment is a non contact alignment treatment, it is effective in that the quantitative alignment treatment can be controlled without generation of the static electricity or the dusts. Moreover, photo-dimerization type materials have an advantage of being high in exposure sensitivity compare to other materials used for the photo-dimerization type material such as a photo-isomerization type material.

In the present invention, since the rubbed layer is used for the first alignment layer and the photo alignment layer using a photo-dimerization type material is used as the second alignment layer are used, anisotropy is easily imparted to the second alignment layer and a liquid crystal display with no alignment defects such as zigzag defect or the hairpin defect can be obtained.

The liquid crystal display of the present invention can be driven by an active matrix system using thin film transistors (TFTs). In this case, it is preferred that the first alignment treatment substrate is a TFT substrate having TFTs formed on the first substrate and the second alignment treatment substrate is a common electrode substrate, in which the second electrode layer is a common electrode. FIG. 9 is a schematic perspective view illustrating an example of a liquid crystal display based on an active matrix system using TFTs.

The liquid crystal display 2 illustrated in FIG. 9 has: a TFT substrate (first alignment treatment substrate) 6, in which TFT elements 25 are provided in a matrix form on a first substrate 3, and a common electrode substrate (second alignment treatment substrate) 16, in which a common electrode 14 is formed on a second substrate 13. In the TFT substrate (first alignment treatment substrate) 6, gate electrodes 24x, source electrodes 24y and pixel electrodes (first electrode layer) 4 are formed. The gate electrodes 24x and the source electrodes 24y are arranged lengthways and sideways, respectively. When signals are supplied to the gate electrodes 24x and the source electrodes 24y, the TFT elements 25 are operated so that the ferroelectric liquid crystal can be driven. Regions where the gate electrodes 24x and the source electrodes 24y cross each other are insulated with an insulating layer, which is not illustrated. Signals to the gate electrodes 24x can act independently of signals to the source electrodes 24y. Regions surrounded by the gate electrodes 24x and the source electrodes 24y are each a pixel, which is a minimum unit for driving the liquid crystal display of the invention. In each of the pixels, one or more TFT elements 25 and one or more pixel electrodes (first electrode layer) 4 are formed. By applying signal voltages successively to the gate electrodes and the source electrodes, the TFT elements in the individual pixels can be operated. In FIG. 9, a liquid crystal layer and a first alignment layer are omitted.

When the gate electrodes are made into a high voltage, for example, about 30 V in the above-mentioned liquid crystal display, the switches of the TFT elements turn on so that a signal voltage is applied to the ferroelectric liquid crystal through the source electrodes. When the gate electrodes are made into a low voltage, for example, about −10 V, the switches of the TFT elements turn off. As illustrated in FIG. 10, in the state of switching-off, a voltage is applied to between the common electrode (second electrode layer) 14 and the gate electrodes 24x so as to make the side of the common electrode (second electrode layer) 14 positive. In this switching-off state, the ferroelectric liquid crystal does not act, so that the corresponding pixels turn into a dark state.

As described above, in the present invention, the spontaneous polarization of the liquid crystal molecules has a tendency to be directed to the side of the first alignment treatment substrate by polar surface interaction in a non-voltage-applying state. Specifically, as illustrated in FIG. 10, in the state of switching-off, the spontaneous polarization Ps of the liquid crystal molecules 1 is directed to the side of the TFT substrate (first alignment treatment substrate) 6. Accordingly, the direction of the spontaneous polarization is not affected by the voltage applied to between the common electrode (second electrode layer) 14 and the gate electrodes 24x.

On the other hand, for example, when the spontaneous polarization is directed to the common electrode substrate (second alignment treatment substrate) side in a non-voltage-applying state, the direction of the spontaneous polarization is reversed, near the regions where the gate electrodes are formed, by the effect of the voltage applied to between the common electrode and the gate electrodes in the state of switching-off. As a result, near the regions where the gate electrodes are formed, the ferroelectric liquid crystal operates in spite of the switching-off state, so that light leaks.

In contrast, in the present invention, the direction of the spontaneous polarization is not affected by the voltage applied to between the common electrode and the gate electrodes, as described above. As a result, no light is leaked. In the present invention, therefore, light leakage near the regions of the gate electrodes can be prevented by controlling the direction of the spontaneous polarization and rendering the second alignment treatment substrate a common electrode substrate.

Each of the constituent members of the liquid crystal display of the invention will be described in detail hereinafter.
1. Ferroelectric Liquid Crystal The ferroelectric liquid crystal used in the present invention exhibits mono-stability, and a molecular direction of the ferroelectric liquid crystal is changed by about 2 times a tilt angle of the ferroelectric liquid crystal parallel to a surface of the first alignment treatment substrate when a negative voltage is applied to the second electrode layer.

The wording "the molecular direction of the ferroelectric liquid crystal is changed by about 2 times the tilt angle $\theta$ of the ferroelectric liquid crystal to the first alignment treatment substrate surface when a negative voltage is applied to the second electrode layer" means the following: each of the liquid crystal molecules is stabilized into a single state on the cone when no voltage is applied thereto; when a negative voltage is applied to the second electrode layer, the liquid crystal molecule is inclined to one side on the cone from the mono-stability state; when a positive voltage is applied to the second electrode layer, the liquid crystal molecule is kept in the mono-stability state or is inclined from the mono-stability state to the side reverse to the side when a negative voltage is applied to the second electrode layer; and the inclination angle of the liquid crystal molecule from the mono-stability state when a negative voltage is applied to the second electrode layer is larger than the inclination angle of the liquid crystal molecule from the mono-stability state when a positive voltage is applied to the second electrode layer.

FIGS. 11A to 11C are each a schematic view illustrating an example of the alignment state of a ferroelectric liquid crystal exhibiting mono-stability. FIGS. 11A, 11B and 11C illustrate a case where no voltage is applied thereto, a case where a negative voltage is applied to the second electrode layer, and a case where a positive voltage is applied to the second electrode layer, respectively. In the non-voltage-applied case, each liquid crystal molecule 1 is stabilized into a single state on the cone (FIG. 11A). In the case where a negative voltage is applied to the second electrode layer, the liquid crystal molecule 1 is inclined from the stabilized state (broken line) to one side (FIG. 11B). In the case where a positive voltage is applied to the second electrode layer, the liquid crystal molecule 1 is inclined from the stabilized state (broken line) to the side reverse to the side when a negative voltage is applied to the second electrode layer (FIG. 11C). In this case, the inclination angle $\delta$ when the negative voltage is applied to the second electrode layer is larger than the inclination angle $\omega$ when the positive voltage is applied to the second electrode layer. In FIGS. 11A to 11C, "d" represents the direction of alignment treatment, and "z" represents a layer normal line.

When a negative voltage is applied to the second electrode layer, each of the liquid crystal molecules is inclined from the mono-stability state to one side on the cone at an angle corresponding to the applied voltage. As illustrated in FIG. 11A, in the ferroelectric liquid crystal, a position A (the direction of the liquid crystal molecule 1), a position B (the alignment treatment direction "d"), and a position C are not necessarily consistent with each other. As illustrated in FIG. 11B, therefore, the maximum inclination angle $\delta$ when a negative voltage is applied to the second electrode layer is about 2 times the tilt angle $\theta$ (angle $2\theta$).

As illustrated in, for example, FIG. 5, the direction of the liquid crystal molecules 1 is changed by about 2 times the tilt angle $\theta$ (angle $2\theta$) parallel to the first alignment treatment substrate surface. The wording "being changed by about 2 times the tilt angle $\theta$" means a case of being changed by an angle of $2\theta$ to $2\theta-5°$.

The angle where the molecular direction of the ferroelectric liquid crystal is changed parallel to the first alignment treatment substrate surface can be measured as follows. First, a polarizing microscope in which polarizing plates are provided under a Crossed Nicol condition and a liquid crystal display are positioned to make the polarizing axis of one of the polarizing plates parallel to the alignment direction of liquid crystal molecules of its liquid crystal layer. This position is used as a standard. When a voltage is applied thereto, the liquid crystal molecules come to have a predetermined angle to the polarizing axis; thus, polarized light penetrating through one polarizing plate transmitted through the other polarizing plate so that a bright state is generated. In this voltage-applying state, the liquid crystal display is rotated so as to be turned into a dark state. The angle at which the liquid crystal display is rotated at this time is measured. The angle at which the liquid crystal display is rotated is the angle at which the molecular direction of the ferroelectric liquid crystal is changed parallel to the first alignment treatment substrate surface.

As described above, when a negative voltage is applied to the second electrode layer, each of the liquid crystal molecules is inclined from the mono-stability state thereof to one side on the cone at an angle corresponding to the applied voltage. Thus, in the case that the liquid crystal display is actually driven, it cannot be said that the direction of the liquid crystal molecule is changed by about 2 times the tilt angle when a negative voltage is applied to the second electrode layer.

Figure 12:
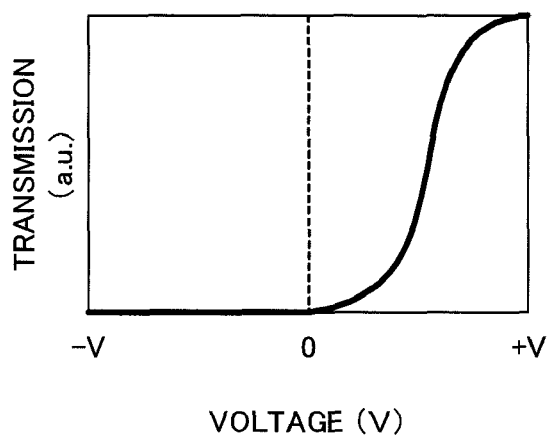
FIGS. 12A and 12B are each a graph showing changes in transmission to a voltage applied to ferroelectric liquid crystals.
Figure 12B:
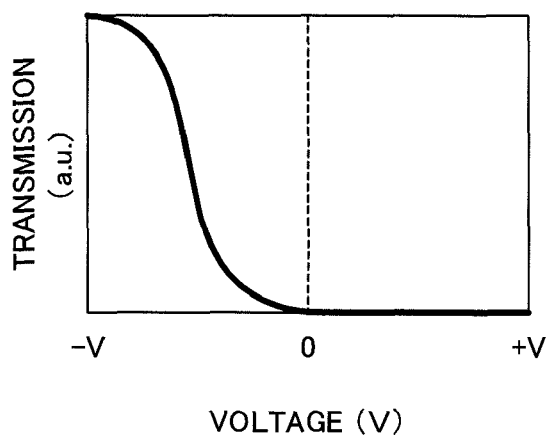

As such a ferroelectric liquid crystal, specifically, the following is used: a ferroelectric liquid crystal having a half-V shaped switching (referred to as "HV-shaped switching" hereinafter) characteristics, in which the liquid crystal molecules operate only when either one of positive and negative voltages, as illustrated in FIGS. 12A and 12B, is applied thereto. Since a ferroelectric liquid crystal showing the HV-shaped switching is used, the opening time as a black and white shutter can be provided for a sufficiently long time. Thereby, each color to be switched by time can be displayed further brightly so that a bright color liquid crystal display can be realized.

The "HV-shaped switching characteristics" mean electro-optic characteristics of exhibiting an asymmetric light transmission in response to applied voltage.

The phase sequence of the ferroelectric liquid crystal is not particularly limited as long as a chiral smectic phase (SmC*) is expressed. Examples thereof include: a phase sequence where a phase change of nematic phase (N)-cholesteric phase (Ch)-chiral smectic C phase (SmC*) advances in temperature lowering process; a phase sequence where a phase change of nematic phase (N)-chiral smectic C phase (SmC*) advances in a temperature lowering process; a phase sequence where a phase change of nematic phase (N)-smectic A phase (SmA)-chiral smectic C phase (SmC*) advances in temperature lowering process; and a phase sequence where a phase change of nematic phase (N)-cholesteric phase (CH)-smectic A phase (SmA)-chiral smectic C phase (SmC*) advances in temperature lowering process.

Figure 13:
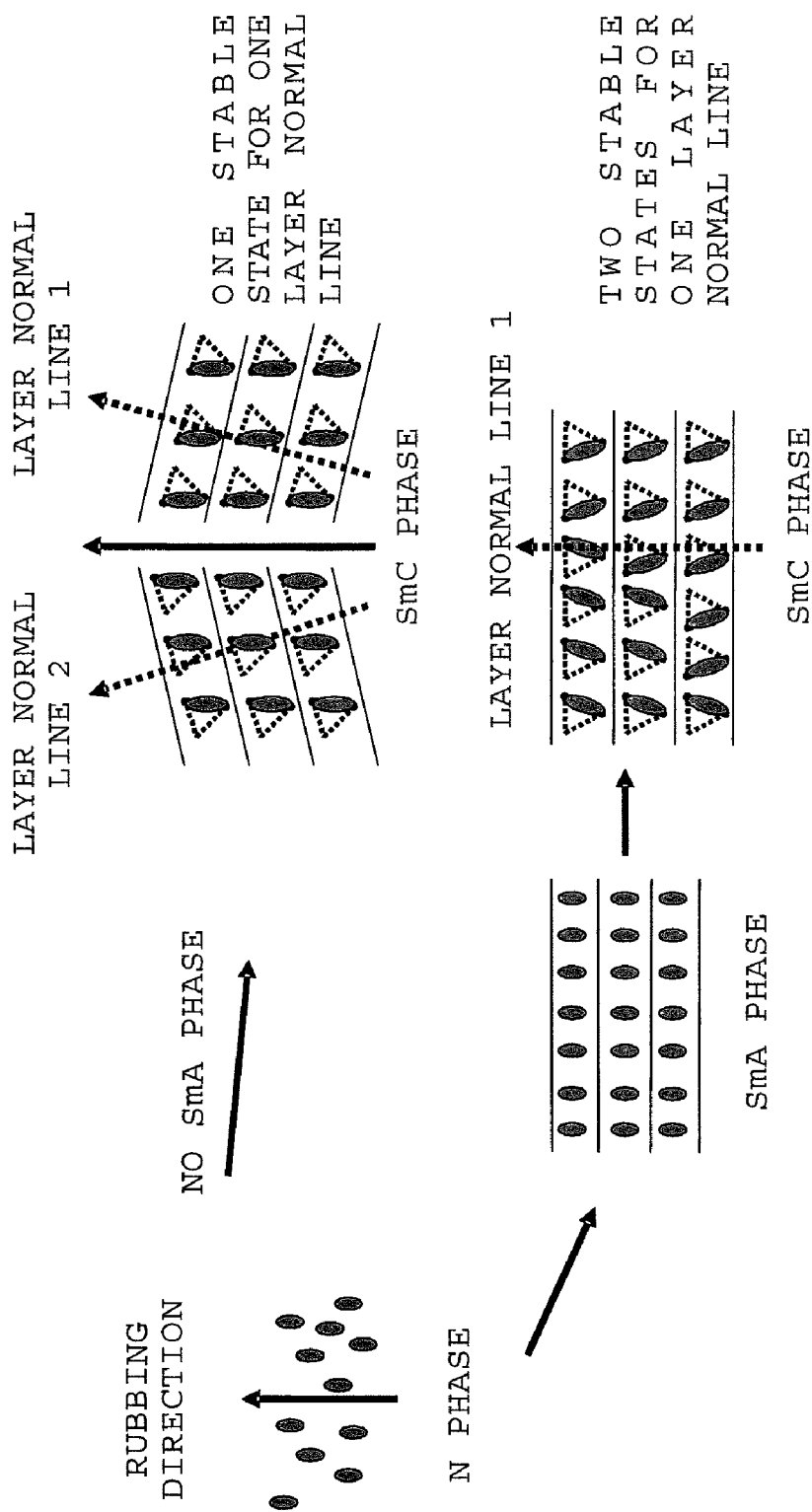
FIG. 13 is a view illustrating a difference of alignment based on a difference of the phase sequence that the ferroelectric liquid crystal has.
Figure 14:
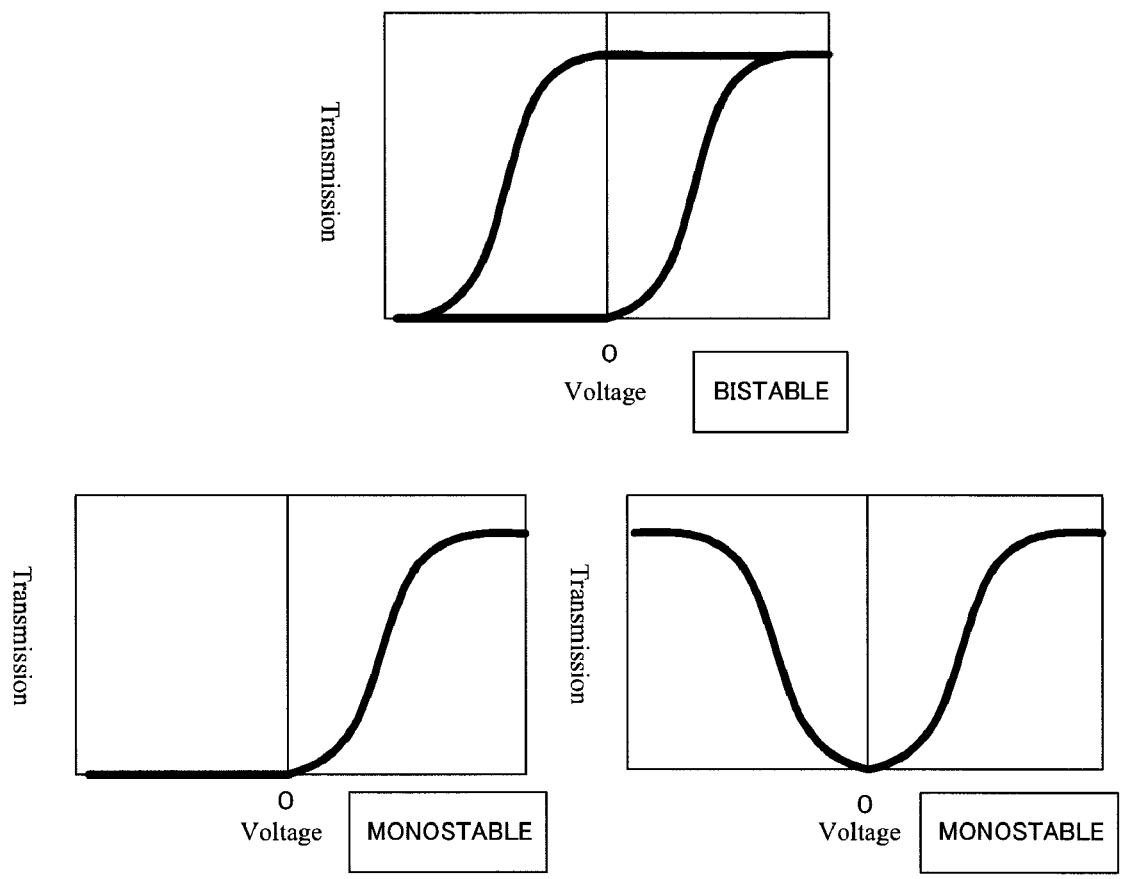
FIG. 14 is graphs each showing changes in transmission to a voltage applied to ferroelectric liquid crystals.

In general, the ferroelectric liquid crystal having the phase sequence passing through SmA phase as exemplified in the lower part of FIG. 13 has the layer interval of the smectic layer shorten in the phase change process so as to have a chevron structure with the smectic layer bent for compensating the volume change. According to the bent direction, a domain having a different longer axis direction of the liquid crystal molecule is formed so as to easily generate the alignment defect called the zigzag defect or the hairpin defect in the boundary surface, and thus it is problematic. Generally, in a ferroelectric liquid crystal having a phase sequence which does not pass through SmA phase as illustrated in the upper part of FIG. 13, two domains (double domains) in which their layer normal lines are different from each other are easily generated. In the invention, the alignment of a ferroelectric liquid crystal can be made into a mono-stability state without generating such alignment defects.

Such a ferroelectric liquid crystal can be variously selected from generally-known liquid crystal materials in accordance with required properties.

The liquid crystal material which expresses a SmC* phase from a Ch phase without passing through SmA phase is particularly suitable as a material exhibiting HV-shaped switching characteristics. A specific example thereof is "R2301" manufactured by AZ Electronic Materials.

The liquid crystal material with a phase sequence of passing through a SmA phase is preferably a liquid crystal material which expresses a SmC* phase from a Ch phase by passing through a SmA phase since the material can be selected from wide range. In this case, as such a ferroelectric liquid crystal, although a single material expressing the SmC* phase can be used, a material expressing the above-mentioned phase sequence by adding a small amount of an optically active substance not expressing the SmC phase itself but capable of inducing the spontaneous polarization and an appropriate spiral pitch to a low viscosity non-chiral liquid crystal easily expressing the SmC phase (hereinafter, it may be referred to as the host liquid crystal) is preferable. This is because it has low viscosity and capable of realizing a faster response.

As the host liquid crystal mentioned above, a material expressing the SmC phase in a wide temperature range is preferable. Those commonly known as a host liquid crystal for a ferroelectric liquid crystal can be used without limitation particularly. For example, a compound represented by the below-mentioned general formula:

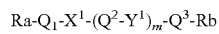

(in the formula, Ra and Rb are each a straight chain or branched alkyl group, an alkoxy group, an alkoxy carbonyl group, an alkanoyloxy group or an alkoxy carbonyloxy group; $Q^1$, $Q^2$ and $Q^3$ are each a 1,4-phenylene group, a 1,4-cyclohexylene group, a pyridine-2,5-diyl group, a pyradine-2,5-diyl group, a pyridazine-3,6-diyl group or a 1,3-dioxane-2,5-diyl group, in which these groups may have a substituent group such as a halogen atom, a hydroxyl group and a cyano group; $X^1$ and $Y^1$ are each —COO—, —OCO—, —CH$_2$O—, —OCH$_2$—, —CH$_2$CH$_2$—, —C≡C— or a single bond; and m is 0 or 1) can be used. As the host liquid crystal, the above-mentioned compounds can be used either alone by one kind or as a combination of two or more kinds.

The optically active substance to be added to the above-mentioned host liquid crystal is not particularly limited as long as it is a material having the large spontaneous polarization and the ability capable of inducing an appropriate spiral pitch. Those commonly known as a material to be added to a liquid crystal composition expressing the SmC phase can be used. In particular, a material capable of inducing the large spontaneous polarization by a small addition amount is preferable. As such an optically active substance, for example, a compound represented by the below-mentioned general formula:

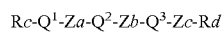

(in the formula, each $Q^1$, $Q^2$, $Q^3$ denotes the same things as in the above-mentioned general formula; Za, Zb and Zc are each —COO—, —OCO—, —CH$_2$O—, —OCH$_2$—, —CH$_2$CH$_2$—, —C≡C—, —CH═N—, —N═N—, —N(→O)═N—, —C(═O)S— or a single bond; Rc is a straight chain or branched alkyl group, which may have an asymmetric carbon atom, an alkoxy group, an alkoxy carbonyl group, an alkanoyloxy group or an alkoxy carbonyloxy group; Rd is a straight chain or branched alkyl group having an asymmetric carbon atom, an alkoxy group, an alkoxy carbonyl group, an alkanoyloxy group or an alkoxy carbonyloxy group, and Rc and Rd each may be substituted with a halogen atom, a cyano group or a hydroxyl group) can be used. As the optically active substance, the above-mentioned compounds can be used either alone by one kind or as a combination of two or more kinds.

As the ferroelectric liquid crystal by way of the SmA phase, specifically, "FELIXM4851-100" manufactured by AZ Electronic Materials, or the like can be presented.

In the liquid crystal display using a ferroelectric liquid crystal exhibiting mono-stability, the transmission thereof depends on the inclination angle of the liquid crystal molecules when a voltage is applied thereto. When either one of positive and negative voltages is applied thereto, each of the liquid crystal molecules is inclined on the cone. As illustrated in, for example, FIGS. 12A and 12B, therefore, the inclination angle of the liquid crystal molecules is changed in accordance with the applied voltage, so that the transmission is changed. In this case, the transmission becomes maximum when the inclination angle of the liquid crystal molecules is 45° from the mono-stability state.

Accordingly, in order to realize a high transmission, it is preferred to use a ferroelectric liquid crystal in which the inclination angle of liquid crystal molecules becomes 45° from the mono-stability state in the case that a negative voltage is applied to the second electrode layer when the liquid crystal display is actually driven.

In the case of using, for example, a ferroelectric liquid crystal in which the maximum inclination angle δ of liquid crystal molecules from the mono-stability state thereof is larger than 45° as illustrated in FIGS. 11A to 11C, the inclination angle of the liquid crystal molecules from the mono-stability state can be set to 45° when a negative voltage is applied to the second electrode layer during actual driving of the liquid crystal display for the following reason: as described above, it cannot be said that when a negative voltage is applied to the second electrode layer during the actual driving, the direction of the liquid crystal molecules is changed by about 2 times the tilt angle.

In the present invention, a liquid crystal layer is constituted by holding the ferroelectric liquid crystal between the first alignment layer and the second alignment layer.

Other than the ferroelectric liquid crystal mentioned above, a compound or compounds which has an optional function according to the various functions required for the liquid crystal display may be contained in the liquid crystal layer. As an example of such a compound, a polymerized product of a polymerizable monomer can be cited. By containing such polymerized product of a polymerizable monomer in the liquid crystal layer, alignment of the liquid crystal material is so-called "polymer stabilized" and a liquid crystal display excellent in alignment stability can be obtained.

The polymerizable monomer used in the polymerized product of the polymerizable monomer is not particularly limited as long as it is a compound generating a polymerized product by the polymerization reaction. As such a polymerizable monomer, a thermosetting resin monomer to generate the polymerization reaction by a heat treatment, and an active radiation curable resin monomer to generate the polymerization reaction by the irradiation of an active radiation can be presented. Among them, it is preferable to use an active radiation curable resin monomer. Since the thermosetting resin monomer requires the heat treatment for generating the polymerization reaction, the regular sequence of the ferroelectric liquid crystal may be deteriorated or the phase transition may be induced by such a heat treatment. On the other hand, according to the active radiation curable resin monomer, such risk can be eliminated so that the ferroelectric liquid crystal sequence can hardly be deteriorated by the generation of the polymerization reaction.

As the active radiation curable resin monomer, an electron beam curable resin monomer to generate the polymerization reaction by the irradiation of an electron beam, and a photo setting resin monomer to generate the polymerization reaction by the light irradiation can be presented. Among them, it is preferable to use a photo setting resin monomer because manufacturing process of a liquid crystal display can be simplified by using the photo setting resin monomer.

The photo setting resin monomer is not particularly limited as long as it generates the polymerization reaction by the irradiation of a light beam having a wavelength in a range of 150 nm to 500 nm. In particular, it is preferable to use an ultraviolet curable resin monomer to generate the polymerization reaction by the irradiation of a light beam having a wavelength in a range of 250 nm to 450 nm, in particular, in a range of 300 nm to 400 nm because it is advantageous in terms of the convenience in the irradiating device, or the like.

The polymerizable functional group of the ultraviolet curable resin monomer is not particularly limited as long as it generates the polymerization reaction by the irradiation of an ultraviolet ray of the above-mentioned wavelength range. In particular, it is preferable to use an ultraviolet curable resin monomer having an acrylate group.

The ultraviolet curable resin monomer may be a monofunctional monomer having one polymerizable functional group in one molecule, or a polyfunctional monomer having two or more polymerizable functional groups in one molecule. In particular, it is preferable to use a polyfunctional monomer. By using a polyfunctional monomer, a stronger polymer network can be formed and the intermolecular force and the polymer network at the photo alignment layer interface can be reinforced. Thereby, disturbance in the sequence of the ferroelectric liquid crystal by the temperature change of the liquid crystal layer can be restrained.

Among the polyfunctional monomer, it is preferable to use a bifunctional monomer having a polymerizable functional group on the both ends of the molecule. Since the polymerizable functional group is provided on the both ends of the molecule, a polymer network can be formed with a wide interval between the polymers so that decline of the driving voltage of the ferroelectric liquid crystal by the inclusion of a polymerized product of a polymerizable monomer in the liquid crystal can be prevented.

Among the ultraviolet curable resin monomer, it is preferable to use an ultraviolet curable liquid crystal monomer to realize the liquid crystal property. The reason why such an ultraviolet curable liquid crystal monomer is preferable is as follows. That is, since the ultraviolet curable liquid crystal monomer shows the liquid crystal property, it can be arranged regularly by the alignment limiting force of the photo alignment layer. Therefore, by generating the polymerization reaction after regularly arranging the ultraviolet curable liquid crystal monomer, it can be fixed while maintaining the regular sequence state in the liquid crystal layer. Since a polymerized product having such a regular sequence state is present in the liquid crystal layer, the alignment stability of the ferroelectric liquid crystal can be improved so that the liquid crystal display excellent in heat resistance and impact resistance can be obtained.

The liquid crystal phase of the ultraviolet curable liquid crystal monomer is not particularly limited, and for example, the nematic phase, the SmA phase, and the SmC phase can be presented.

As the ultraviolet curable liquid crystal monomer used in the present invention, for example, the compounds represented by a below formulae (1) to (3) can be presented.

[Chemical Formula 1]

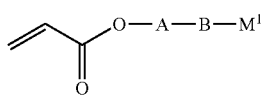
(1)

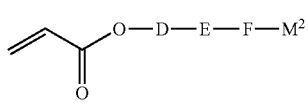
(2)

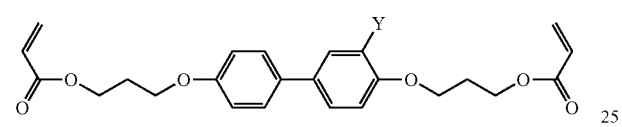
(3)

In the above-mentioned formulae (1) and (2), A, B, D, E and F are benzene, cyclohexane or pyrimidine, which may have a substituent group such as halogen. Moreover, A and B, or D and E may be bonded via a bonding group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group on the molecular chain end and A or D may be bonded via a bonding group such as an alkylene group having 3 to 6 carbon atoms.

In the formula (3), Y is hydrogen, alkyl having 1 to 20 carbon atoms, alkenyl having 1 to 20 carbon atoms, alkyloxy having 1 to 20 carbon atoms, alkyloxy carbonyl having 1 to 20 carbon atoms, formyl, alkyl carbonyl having 1 to 20 carbon atoms, alkyl carbonyloxy having 1 to 20 carbon atoms, halogen, cyano or nitro.

Out of the compounds represented by the above-mentioned formulae, the compounds of below-mentioned formulae can be presented as the specific compounds to be used preferably.

[Chemical Formula 2]

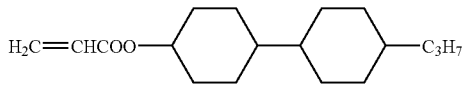

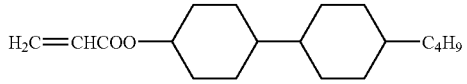

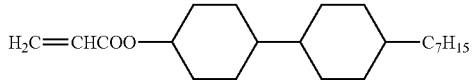

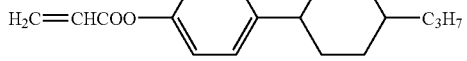

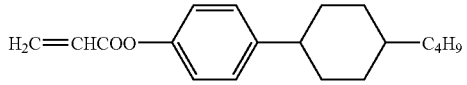

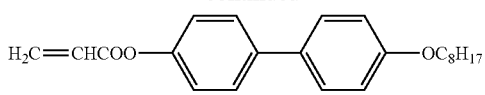

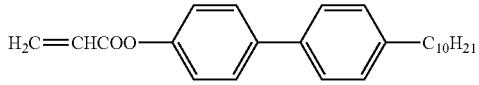

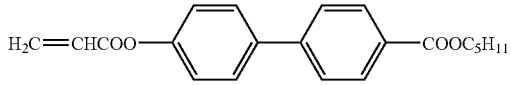

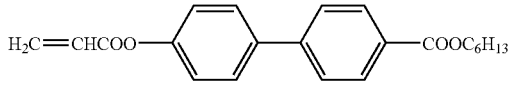

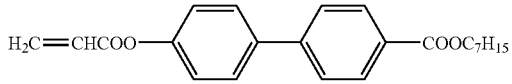

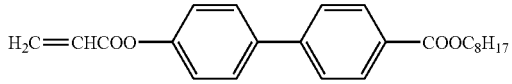

[Chemical Formula 3]

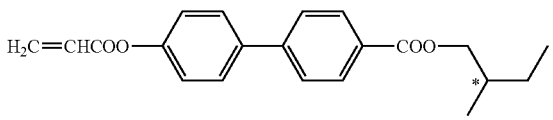

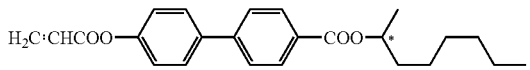

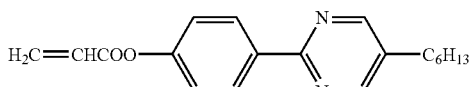

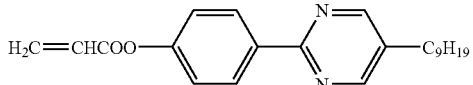

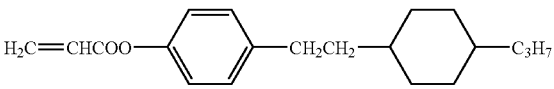

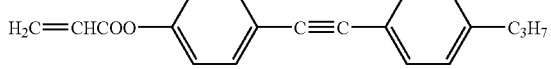

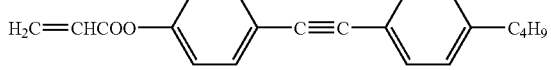

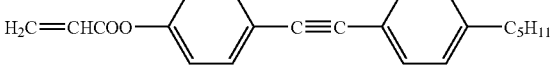

[Chemical Formula 4]

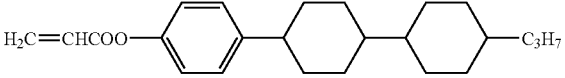

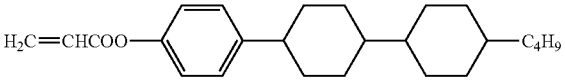

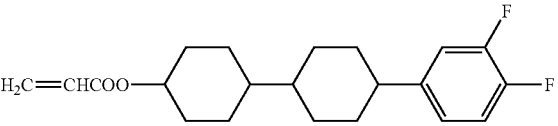

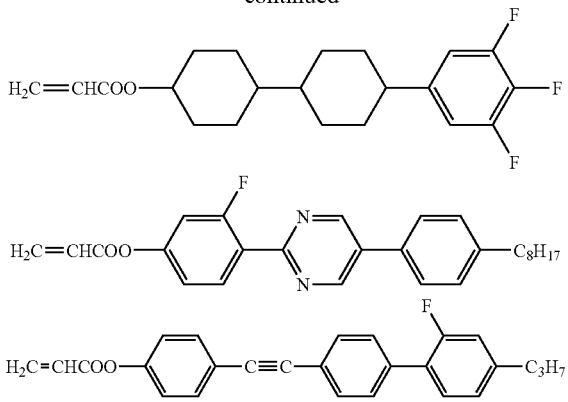

The polymerizable monomer used may be a single polymerizable monomer, or a combination of two or more different polymerizable monomers. In the case of using two or more different polymerizable monomers, for example, an ultraviolet curable liquid crystal monomer shown in the above-mentioned formulae and another ultraviolet curable resin monomer can be used.

In the case the ultraviolet curable liquid crystal monomer is used as the polymerizable monomer, the polymerized product of the polymerizable monomer used may be a main chain liquid crystalline polymerized product with the main chain showing the liquid crystalline property for an atomic group showing the liquid crystalline property provided in the main chain, or a side chain liquid crystalline polymerized product with the side chain showing the liquid crystalline property for an atomic group showing the liquid crystalline property provided in the side chain. Among them, a side chain liquid crystalline polymerized product is preferable. Since an atomic group showing the liquid crystalline property is present in the side chain, the freedom of the atomic group becomes high so that the atomic group showing the liquid crystalline property can be aligned easily. Moreover, as a result, the alignment stability of the ferroelectric liquid crystal can be improved.

The presence amount of the polymerized product of the polymerizable monomer in the liquid crystal layer is not particularly limited as long as it is in a range capable of providing the sequence stability of the ferroelectric liquid crystal to a desirable degree. In general, it is preferably in a range of 0.5% by mass to 30% by mass in the liquid crystal layer, more preferably in a range of 1% by mass to 20% by mass, and particularly preferably in a range of 1% by mass to 10% by mass. In the case it is more than the above-mentioned range, increase in the driving voltage of the ferroelectric liquid crystal and the decline in the response speed may be generated. Moreover, in the case it is less than the above-mentioned range, due to the insufficiency of the sequence stability in the ferroelectric liquid crystal, the heat resistance and the impact resistance of the liquid crystal display may be deteriorated.

Here, the presence amount of the polymerized product of the polymerizable monomer in the liquid crystal layer can be calculated from the residual amount provided by measuring the weight of the residual polymerized product of the polymerizable monomer with an electron scale after washing the monomolecular liquid crystal in the liquid crystal layer with a solvent, and the total mass of the above-mentioned liquid crystal layer.

In the invention, since the ferroelectric liquid crystal exhibits mono-stability, the liquid crystal can be driven by an active matrix system using thin film transistors (TFT) and gray scale control can be attained by voltage modulation.

The thickness of the liquid crystal layer is preferably from 1.2 μm to 3.0 μm, more preferably from 1.3 μm to 2.5 μm, even more preferably from 1.4 μm to 2.0 μm. If the thickness of the liquid crystal layer is too small, the contrast may lower. Conversely, if the thickness is too large, the liquid crystal may not be aligned with ease. The thickness of the liquid crystal layer can be adjusted by a membrane such as a bead spacer, columnar spacer, or a partition wall.

As the method for forming such liquid crystal layer, a method which is generally used as a method for forming a liquid crystal cell can be used. For example, a vacuum injection method or a One Drop Fill method can be used.

In the vacuum injection method, the liquid crystal layer can be formed, by making use of capillary effect to inject an isotropic liquid obtained by heating the ferroelectric liquid crystal into a liquid crystal cell, which is formed by forming the first alignment treatment substrate and the second alignment treatment substrate beforehand, and then sealing the cell with an adhesive agent.

In the One Drop Fill method, for example, a liquid crystal layer can be formed by: dropping the heated ferroelectric liquid crystal on the second alignment layer of the second alignment treatment substrate, coating a sealing agent in the circumferential part of the first alignment treatment substrate, superimposing the first alignment treatment substrate and the second alignment treatment substrate under a reduced pressure, and adhering them with the sealing agent.

2. First Alignment Treatment Substrate

The first alignment treatment substrate used in the present invention comprises a first substrate, a first electrode layer formed on the first substrate, and the first alignment layer which is the rubbed layer and formed on the first electrode layer. Hereinafter, each of the constituents of the first alignment treatment substrate will be described.

(1) First Alignment Layer

The first alignment layer used in the present invention is the rubbed layer and is formed on the first electrode layer.

Any material may be used as the material for the rubbed layer without any particular limitation insofar as it can impart anisotropy to the first alignment layer by rubbing treatment. Examples of the material may include polyimide, polyamide, polyamideimide, polyether imide, polyvinyl alcohol and polyurethane. These compounds may be used either alone or in combinations of two or more.

Among these compounds, polyimide is preferably contained in the rubbed layer and polyimide obtained from polyamic acid by cyclodehydration (imidization) is particularly preferable.

The polyamic acid may be synthesized by a diamine compound reacting with an acid dianhydride.

As the diamine compound to be used in the synthesis of the polyamic acid, an alicyclic diamine, carbocyclic aromatic diamines, heterocyclic diamines, aliphatic diamine and aromatic diamine are exemplified.

Examples of the alicyclic diamine include 1,4-diaminocyclohexane, 1,3-diaminocyclohexane, 4,4'-diaminodicyclohexylmethane, 4,4'-diamino-3,3'-dimethyldicyclohexane and isophorone diamine.

Examples of the carbocyclic aromatic diamines include o-phenylenediamine, m-phenylenediamine, p-phenylenediamine, diaminotoluenes (specifically, 2,4-diaminotoluene), 1,4-diamino-2-methoxybenzene, diaminoxylenes (specifically, 1,3-diamino-2,4-dimethylbenzene), 1,3-diamino-4- chlorobenzene, 1,4-diamino-2,5-dichlorobenzene, 1,4-diamino-4-isopropylbenzene, 2,2'-bis(4-aminophenyl)propane, 4,4'-diaminodiphenylmethane, 2,2'-diaminostilbene, 4,4'-diaminostilbene, 4,4'-diaminodiphenyl ether, 4,4'-diphenyl thioether, 4,4'-diaminodiphenylsulfone, 3,3'-diaminodiphenylsulfone, phenyl ester 4,4'-diaminobenzoate, 4,4'-diaminobenzophenone, 4,4'-diaminobenzyl, bis(4-aminophenyl)phosphine oxide, bis(3-aminophenyl)sulfone, bis(4-aminophenyl)phenylphosphine oxide, bis(4-aminophenyl)cyclohexylphosphine oxide, N,N-bis(4-aminophenyl)-N-phenylamine, N,N-bis(4-aminephenyl)-N-methylamine, 4,4'-diaminodiphenylurea, 1,8-diaminonaphthalene, 1,5-diaminonaphthalene, 1,5-diaminoanthraquinone, diaminofluorenes (specifically, 2,6-diaminofluorene), bis(4-aminophenyl)diethylsilane, bis(4-aminophenyl)dimethylsilane, 3,4'-diaminodiphenyl ether, benzidine, 2,2'-dimethylbenzidine, 2,2-bis[4-(4-aminophenoxy)phenyl]propane, bis[4-(4-aminophenoxy)phenyl]sulfone, 4,4'-bis(4-aminophenoxy)biphenyl, 2,2-bis[4-(4-aminophenoxy)phenyl]hexafluoropropane, 1,4-bis(4-aminophenoxy)benzene and 1,3-bis(4-aminophenoxy)benzene.

Examples of the heterocyclic diamines include 2,6-diaminopyridine, 2,4-diaminopyridine, 2,4-diamino-s-triazine, 2,5-diaminodibenzofuran, 2,7-diaminocarbazole, 3,6-diaminocarbazole, 3,7-diaminophenothiazine, 2,5-diamino-1,3,4-thiadiazole and 2,4-diamino-6-phenyl-s-triazine.

Examples of the aliphatic diamine include 1,2-diaminoethane, 1,3-diaminopropane, 1,4-diaminobutane, 1,5-diaminopentane, 1,6-diaminohexane, 1,8-diaminooctane, 1,10-diaminodecane, 1,3-diamino-2,2-dimethylpropane, 1,6-diamino-2,5-dimethylhexane, 1,5-diamino-2,4-dimethylheptane, 1,7-diamino-3-methylheptane, 1,9-diamino-5-methylnonane, 2,11-diaminododecane, 1,12-diaminooctadecane and 1,2-bis(3-aminopropoxy)ethane.

Examples of the aromatic diamine include those having a long-chain alkyl or perfluoro group represented by the following structural formula.

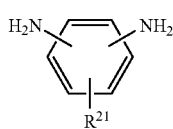

[Chemical Formula 5]

Here, $R^{21}$ in the above formula represents a long-chain alkyl group having 5 or more carbon atoms, preferably a long-chain alkyl group having 5 to 20 carbon atoms or a monovalent organic group containing a long-chain alkyl group or a perfluoroalkyl group.

As the acid dianhydride used as the raw material in the synthesis of the polyamic acid, aromatic acid dianhydride and alicyclic acid dianhydride are exemplified.

Examples of the aromatic acid dianhydride include pyromellitic acid dianhydride, 3,3',4,4'-biphenyltetracarboxylic acid dianhydride, 2,2',3,3'-biphenyltetracarboxylic acid dianhydride, 2,3,3',4'-biphenyltetracarboxilic acid dianhydride, 3,3',4,4'-benzophenone tetracarboxylic acid dianhydride, 2,3,3',4'-benzophenone tetracarboxylic acid dianhydride, bis(3,4-dicarboxyphenyl)ether dianhydride, bis(3,4-dicarboxyphenyl)sulfone dianhydride, 1,2,5,6-naphthalene tetracarboxylic acid dianhydride and 2,3,6,7-naphthalene tetracarboxylic acid dianhydride.

Examples of the alicyclic acid dianhydride include 1,2,3,4-cyclobutanetetracarboxylic acid dianhydride, 1,2,3,4-cyclopentanetetracarboxylic acid dianhydride, 2,3,4,5-tetrahydrofuran tetracarboxylic acid dianhydride, 1,2,4,5-cyclohexanetetracarboxylic acid dianhydride, 3,4-dicarboxy-1-cyclohexylsuccinic acid dianhydride, 3,4-dicarboxy-1,2,3,4-tetrahydro-1-naphthalenesuccinic acid dianhydride and bicyclo[3,3,0]octane-2,4,6,8-tetracarboxylic acid dianhydride.

These acid dianhydrides may be used either alone or in combinations of two or more. It is preferable to use an alicyclic acid dianhydride from the viewpoint of the transparency of the polymer.

Also the polyamic acid may be synthesized by the foregoing diamine compound reacting with an acid dianhydride in the presence of an organic solvent at −20° C. to 150° C. and preferably 0° C. to 80° C. for 30 minutes to 24 hours and preferably 1 hour to 10 hours.

Examples of the method used to obtain the polyimide film by using the polyamic acid include: a method in which after a film of the polyamic acid is formed, a part or all of the polyamic acid is cyclodehydrated (imidization) either by heating or using a catalyst, and a method in which the polyamic acid is partly or wholly cyclodehydrated (imidization) into a soluble polyimide either by heating or using a catalyst, which is then made into a film. Among these methods, it is preferable to use the soluble polyimide because the soluble polyimide obtained by converting the polyamic acid into an imide has excellent storage stability.

Examples of the method used to undergo the imidization reaction to convert the polyamic acid into a soluble polyimide include a thermal imidization method in which a polyamic acid solution is heated as it is, and a chemical imidization method in which a catalyst is added in a polyamic acid solution to form an imide. Among these methods, the chemical imidization method in which an imidization reaction is run at a relatively lower temperature is preferable because this method is resistant to a reduction in the molecular weight of the obtained soluble polyimide.

It is preferable to run the chemical imidization reaction using the polyamic acid in an organic solvent in the presence of a base catalyst in an amount of 0.5 to 30 mol equivalents and preferably 1 to 20 mol equivalents to the amount of the amic acid group and the acid anhydride in an amount of 0.5 to 50 mol equivalents and preferably 1 to 30 mol equivalents to the amount of the amic acid group at −20° C. to 250° C. and preferably 0° C. to 200° C. for 1 hour to 100 hours. This is because if the amount of the base catalyst or the acid anhydride is smaller, the progress of the reaction is insufficient whereas if the amounts are excessive, it is difficult to remove these materials completely after the reaction is finished.

As the base catalyst to be used in the chemical imidization reaction, pyridine, triethylamine, trimethylamine, tributylamine and trioctylamine may be exemplified. Among these compounds, pyridine is preferable because it has basicity moderate to progress the reaction.

As the acid anhydride, acetic acid anhydride, trimellitic acid anhydride and pyromellitic acid anhydride may be exemplified. Among these compounds, it is preferable to use acetic acid anhydride because the use of acetic acid anhydride makes easy to refine the reaction product obtained after the reaction.

As the organic solvent used in the imidization reaction, the same solvent that is used in the synthesis of the polyamic acid may be used.

The imidization ratio of the chemical imidization may be controlled by regulating the amount of the catalyst and reaction temperature. Particularly, the above imidization ratio is preferably 0.1% to 99%, more preferably 5% to 90% and still more preferably 30% to 70% of the molar number of total polyamic acids. This is because if the imidization ratio is too low, it causes deterioration in storage stability, whereas if the imidization ratio is too high, there is the case where the solubility is deteriorated, causing precipitation.

As the material for the rubbed layer, "SE-5291" and "SE-7992" manufactured by NISSAN CHEMICAL INDUSTRIES, LTD. are preferably used.

As the rubbing treatment, a method of imparting anisotropy to the alignment layer by coating the above-mentioned material to the first electrode layer to cure, and by rubbing the obtained layer in a fixed direction with a rubbing cloth can be used.

As the method of coating the above-mentioned material, a roll coating method, rod bar coating method, slot die coating method, wire bar coating method, ink jet method, flexo-printing method, screen printing method or the like may be used.

The thickness of the rubbed layer is designed to be about 1 nm to 1000 nm and preferably in a range from 50 nm to 100 nm.

As the rubbing cloth, for example, those made of a fiber of a nylon resin, a vinyl resin, rayon or cotton may be used. For example, a drum around which such a rubbing cloth is wound is brought into contact with the surface of the layer using the above-mentioned material while rotating the drum to thereby form fine channels in one direction on the surface of the layer, with the result that anisotropy is imparted to the alignment layer.

(2) First Electrode Layer

The first electrode layer used in the present invention is not particularly limited as long as it is generally used as an electrode layer for liquid crystal displays. At least one of the electrode layers of the first electrode layer of the first second alignment treatment substrate or the second electrode layer of the second alignment treatment substrate is preferably a transparent conductor. Preferred examples of the material of the transparent conductor include such as indium oxide, tin oxide, and indium tin oxide (ITO).

In the case of rendering the liquid crystal display obtained in the present invention a liquid crystal display of an active matrix system using TFT, one of the electrode layers of the first and second alignment treatment substrates is rendered a full-face common electrode made of the transparent conductor and the other is rendered an electrode in which gate electrodes and source electrodes are provided in a matrix form and a TFT element and a pixel electrode are provided in a region surrounded by each of the gate electrode and each of the source electrode.

The first electrode layer can be formed by a physical vapor deposition method (PVD) such as chemical vapor deposition (CVD), sputtering, ion plating, or vacuum injection method.

(3) First Substrate

The first substrate used in the present invention is not particularly limited as long as it is generally used as a substrate for liquid crystal displays. For example, a glass plate and a plastic plate can be presented preferably.

(4) Other Structures

In the first alignment treatment substrate of the present invention, a partition wall may be formed on the first substrate. When a partition wall is formed on the second substrate of the second alignment treatment substrate, no partition wall is formed on the first substrate of the first alignment treatment substrate. Specifically, the partition wall may be formed on any of the first alignment treatment substrate and the second alignment treatment substrate.

As the material of the partition wall, a material usually used in the partition wall of liquid crystal displays may be used. To mention in more detail, examples of the material of the partition wall may include resins, among which photosensitive resins are preferably used. This is because the photosensitive resins are easily patterned.

As the method of forming the partition wall, any of the usual patterning methods may be used without any particular limitation insofar as it can form the partition wall at a desired position. Examples of the method include a photolithographic method, ink jet method and screen printing method.

The partition wall is usually formed in plural and it is preferable that plural partition walls be formed regularly at desired positions and it is more preferable that plural partition walls be formed in substantially parallel at equal intervals. This is because if plural partition walls are formed at random positions when a liquid crystal display is manufactured by the One Drop Fill method, there is the case where it is difficult to exactly control the amount of a ferroelectric liquid crystal to be applied.

Although no particular limitation is imposed on the position of the partition walls, the partition walls are preferably formed in a non-pixel area. This is because it is desirable that the partition walls be formed in a non-pixel area having no influence on image display since an alignment defect of a ferroelectric liquid crystal is easily caused in the vicinity of the partition walls. When the first alignment treatment substrate is, for example, a TFT substrate, the partition walls may be arranged on gate electrodes and source electrodes formed in matrix form.

The plural partition walls are formed in pattern form. In this case, for example, the partition walls may be formed in stripe form, matrix form or frame form. When the partition walls are formed in matrix form, the impact resistance can be improved. When the partition walls are formed frame-wise and a liquid crystal display is formed by the One Drop Fill method, frame-like partition walls are formed on the circumferential of the first substrate and a seal agent is applied to the outside circumferential of the frame-like partition walls, thereby preventing a ferroelectric liquid crystal from being brought into contact with the sealing agent which is still in an uncured state, making it possible to avoid deterioration in the properties of the ferroelectric liquid crystal caused by contamination of impurities and the like contained in the sealing agent.

When the partition walls are formed in stripe form and a liquid crystal display is formed by the One Drop Fill method, the partition walls are preferably formed such that the longitudinal direction of the partition wall in stripe form is substantially perpendicular to the alignment treatment direction of the first alignment layer. This is because when the ferroelectric liquid crystal is applied along the partition walls in stripe form, the ferroelectric liquid crystal is induced to flow in substantially parallel to the alignment treatment direction of the first alignment layer to improve aligning ability of the ferroelectric liquid crystal, whereby the generation of aligning defects can be limited.

Here, the term "substantially perpendicular" means that the longitudinal direction of the stripe-like partition wall forms an angle of 90°±5° with the alignment treatment direction of the first alignment layer and this angle is preferably 90°±1°. The above angle may be measured using a polarization microscope by observing the alignment direction of the liquid crystal molecule (the alignment treatment direction of the first alignment layer) and the longitudinal direction of the stripe-like partition wall.

The pitch of the partition walls is designed to be about 100 µm to 10 mm, preferably in a range from 200 µm to 1.5 mm and more preferably in a range from 1.0 mm to 5.0 mm. This is because if the pitch of the partition walls is less than the above range, there is the possibility that display qualities are deteriorated by the alignment defect of the ferroelectric liquid crystal in the vicinities of the partition walls, whereas if the pitch of the partition walls exceeds the above range, there is the case where desired impact resistance is not obtained and it is difficult to keep a constant cell gap, though depending on the size of the liquid crystal display. Here, the pitch of the partition walls means the distance between the centers of adjacent partition walls.

The width of the partition wall is designed to be about 1 µm to 20 µm, preferably in a range from 2 µm to 10 µm and more preferably in a range from 5 µm to 10 µm. When frame-like partition walls are formed on the circumferential of the first substrate, the width of this partition walls in frame form only needs to be enough to prevent the ferroelectric liquid crystal from being brought into contact with the sealing agent which is in an uncured state. Specifically, the width of the partition wall is designed to be about 10 µm to 3 mm, preferably in a range from 10 µm to 1 mm and more preferably in a range from 10 µm to 500 µm. This is because when the width of the partition wall exceeds the above range, the partition walls are also formed in the pixel area resultantly, leading to a decrease in effective pixel area and there is the case where good image display is not obtained, whereas when the width of the partition wall is less than the above range, there is the case where it is difficult to form the partition wall.

Moreover, the height of the partition wall is designed to be the order of the size of a cell gap.

The pitch, width and height of the partition walls may be measured using a scanning electron microscope (SEM) to observe the sections of the partition walls.

No particular limitation is imposed on the number of partition walls as long as the number of partition walls is two or more and the number is properly selected according to the size of the liquid crystal display.

No particular limitation is imposed on the position where the partition walls are formed insofar as it is formed on the first substrate. For example, the partition walls may be formed on the first substrate or may be formed on the first electrode layer.

In the first alignment treatment substrate in this embodiment, a columnar spacer may be formed on the first substrate. When the columnar spacer is formed on the second substrate of the second alignment treatment substrate, no columnar spacer is formed on the first substrate of the first alignment treatment substrate. In other words, the columnar spacer may be formed on any of the first alignment treatment substrate and the second alignment treatment substrate.

As the material of the columnar spacer, a material usually used for the columnar spacer in liquid crystal displays may be used. Specific examples of the material of the columnar spacer may include resins, among which photosensitive resins are preferably used. This is because the photosensitive resins are easily patterned.

As the method of forming the columnar spacer, any usual patterning method may be used without any particular limitation insofar as it can form the columnar spacer at a desired position. Examples of the method include a photolithographic method, ink jet method and screen printing method.

The columnar spacer is usually formed in plural and it is preferable that plural columnar spacers be formed regularly at desired positions and it is more preferable that plural columnar spacers be formed at equal intervals. This is because if plural columnar spacers are formed at random positions when a liquid crystal display is manufactured by the One Drop Fill method, there is the case where it is difficult to exactly control the amount of a ferroelectric liquid crystal to be applied.

The pitch of the columnar spacers is designed to be about 100 µm to 3 mm, preferably in a range from 200 µm to 1.5 mm and more preferably in a range from 300 µm to 1.0 mm. This is because if the pitch of the columnar spacers is less than the above range, there is the possibility that display qualities are deteriorated by the alignment defect of the ferroelectric liquid crystal in the vicinities of columnar spacers, whereas if the pitch of the columnar spacers exceeds the above range, there is the case where no desired impact resistance is obtained and it is difficult to keep a constant cell gap, though depending on the size of the liquid crystal display. Here, the pitch of the columnar spacers means the distance between the centers of adjacent columnar spacers.

As to the size of the columnar spacer, the diameter of the bottom of the columnar spacer is designed to be about 1 µm to 100 µm, preferably in a range from 2 µm to 50 µm and more preferably in a range from 5 µm to 20 µm in the case where the columnar spacer has a cylindrical form. This is because when the size of the columnar spacer exceeds the above range, the columnar spacers are also formed in the pixel area resultantly, leading to a decrease in effective pixel area and there is the case where no good image display is obtained, whereas when the size of the columnar spacer is less than the above range, there is the case where it is difficult to form the columnar spacer.

Moreover, the height of the columnar spacer is designed to be the order of the size of a cell gap.

The pitch, size and height of the columnar spacers may be measured using a scanning electron microscope (SEM) to observe the sections of the partition walls.

Examples of the shape of the columnar spacer may include a cylindrical form, prismatic form and truncated conical form.

Although no particular limitation is imposed on the position of the columnar spacers, the columnar spacers are preferably formed in a non-pixel area. This is because it is desirable that the columnar spacers be formed in a non-pixel area having no influence on image display since an alignment defect of a ferroelectric liquid crystal is easily caused in the vicinity of the columnar spacers. When the first alignment treatment substrate is, for example, a TFT substrate, the columnar spacers may be arranged on gate electrodes and source electrodes formed in matrix form.

No particular limitation is imposed on the number of columnar spacers as long as the number of columnar spacers is two or more and the number is properly selected according to the size of the liquid crystal display.

No particular limitation is imposed on the position of the columnar spacer to be formed insofar as the columnar spacers are formed on the first substrate and, for example, the columnar spacers may be formed on any of the first substrate and the first electrode layer.

In the first alignment treatment substrate used in the present invention, a colored layer may be formed on the first substrate. When a colored layer is formed on the second substrate of the second alignment treatment substrate, no colored layer is formed on the first substrate of the first alignment treatment substrate. Specifically, the colored layer may be formed on any one of the first alignment treatment substrate and the second alignment treatment substrate.

When the colored layer is formed, a color filter system liquid crystal display that can realize color display by the colored layer can be obtained.

As the method of forming the colored layer, methods for forming colored layers in usual color filters may be used. As this method, the pigment dispersion methods (color resist method and etching method), printing methods, ink jet methods and the like may be used.

3. Second Alignment Treatment Substrate

The second alignment treatment substrate used in the present invention comprises: a second substrate, a second electrode layer formed on the second substrate, and a second alignment layer which is formed on the second electrode layer and which is a photo alignment layer using a photo-dimerization type material to impart anisotropy to an alignment layer by generating a photo-dimerization reaction.

The second substrate, second electrode layer and other structure are the same to the respective first substrate, first alignment layer and other structure of the first alignment treatment substrate, and thus, explanations thereof are omitted here. Hereinafter, the second alignment layer of the second alignment treatment substrate will be described.

(1) Second Alignment Layer

The second alignment layer used in the present invention is formed on the second electrode layer and is a photo alignment layer using a photo-dimerization type material to impart anisotropy to an alignment layer by generating a photo-dimerization reaction.

Here, the photo-dimerization reaction denotes to a reaction where two molecules are polymerized by radical polymerization of their reactive sites aligned in the direction of polarization through the light irradiation. This reaction makes it possible to stabilize the alignment in the polarization direction to impart anisotropy to the alignment layer. Photo-dimerization type materials have an advantage of being high in exposure sensitivity and therefore, have a wide selection range. Further, since the photo alignment treatment is a non contact alignment treatment, it is effective in that the quantitative alignment treatment can be controlled without generation of the static electricity or the dusts.

As the photo-dimerization type material used in the present invention, it is not limited to any especial kind if the material can impart anisotropy to the alignment layer by photo-dimerization reaction. The material preferably comprises a photo-dimerization-reactive compound having a radically-polymerizable functional group and showing dichroism having different absorptions depending on the polarization direction thereof. This is because the alignment of the photo-dimerization-reactive compound is stabilized and anisotropy can easily be imparted to the alignment layer by radically-polymerizing its reactive sites aligned in the polarization direction.

Examples of the photo-dimerization-reactive compound having such properties include dimerization-reactive polymers each having, as its side chain, at least one reactive site selected from cinnamic acid ester, coumarin, quinoline, a chalcone group and a cinnamoyl group.

Of these, the following is preferred as the photo-dimerization-reactive compound having such properties: a dimerization-reactive polymer having, as its side chain, any one of cinnamic acid ester, coumarin and quinoline. This is because the compound is radically-polymerized in the state that the double bonds in the α,β-unsaturated ketone aligned in the polarization direction function as reactive sites, whereby anisotropy can easily be imparted to the alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the alignment layer. Conversely, if it is too large, the viscosity of the coating solution at the time of the formation of the alignment layer is so high that a homogeneous coat film may not easily be formed.

As the dimerization-reactive polymer, a compound represented by the following formula (4) can be illustrated:

[Chemical Formula 6]

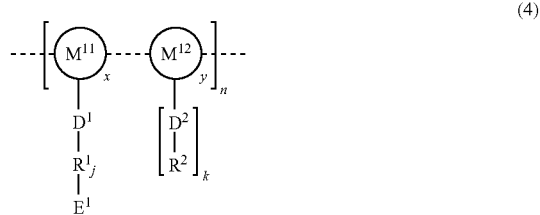

(4)

In the formula (4), $M^{11}$ and $M^{12}$ each independently represents a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^{12}$ may be acrylonitrile, methacrylonitrile, methacrylate, methyl methacrylate, hydroxyalkyl acrylate or hydroxyalkyl methacrylate; x and y each represents the mole ratio of each of the monomer units when the units are polymerized into a copolymer, and are each a number satisfying: $0<x\leq1$, $0\leq y<1$, and $x+y=1$; and "n" represents an integer of 4 to 30,000. $D^1$ and $D^2$ each represent a spacer unit.

$R^1$ is a group represented by $-A^1\text{-}(Z^1\text{—}B^1)_z\text{—}Z^2\text{—}$ and $R^2$ is a group represented by $-A^1\text{-}(Z^1\text{—}B^1)_z\text{—}Z^3\text{—}$, in which $A^1$ and $B^1$ each independently represents a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represents a covalent single bond, —$CH_2$—$CH_2$—, —$CH_2O$—, —$OCH_2$—, —CONR—, —RNCO—, —COO— or —OOC—, in which R is a hydrogen atom or a lower alkyl group; $Z^3$ is a hydrogen atom, alkyl or alkoxy which has 1 to 12 carbon atoms and may have a substituent, cyano, nitro or halogen; z is an integer of 0 to 4; $E^1$ represents a photo dimerization-reactive site, examples of which include cinnamic acid ester, coumarin, quinoline, a chalcone group and a cinnamoyl group; and j and k are each independently 0 or 1.

As the dimerization-reactive polymer, include compounds represented by the following formulae (5) to (8) can be specifically cited:

[Chemical Formula 7]

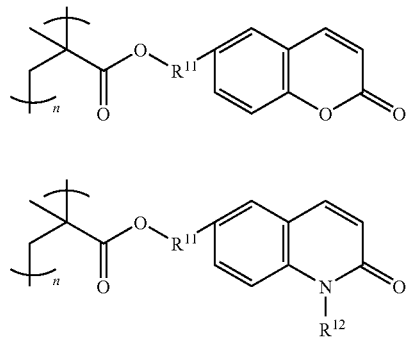

(5)

(6)

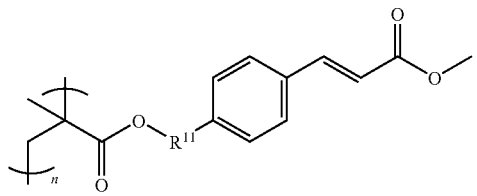

(7)

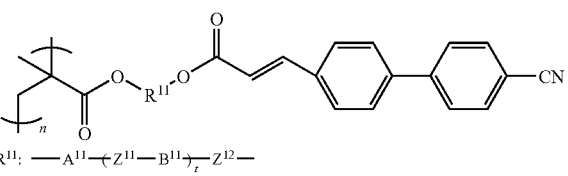

(8)

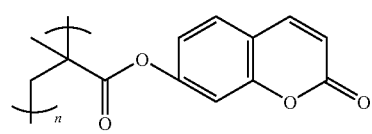

$R^{11}$: —$A^{11}$—$(Z^{11}$—$B^{11})_t$—$Z^{12}$— in which $A^{11}$ and $B^{11}$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —$CH_2$—$CH_2$—, —COO—, —OOC—, or a covalent single bond;

t: an integer of 0 to 4;

$R^{12}$: a lower alkyl; and n: an integer of 4 to 30,000.

As the above-mentioned dimerization-reactive polymers, the compounds (9) to (12) represented by the following formulae can be cited as specific examples:

[Chemical Formula 8]

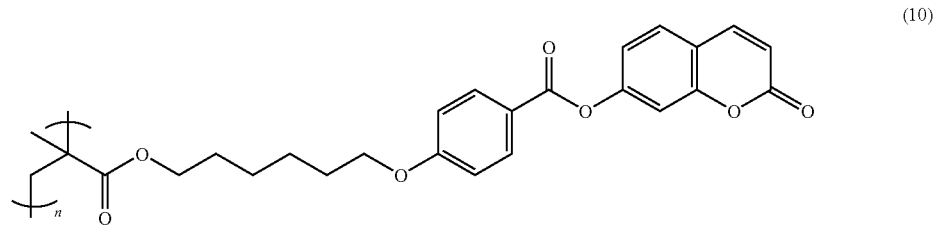

(9)

(10)

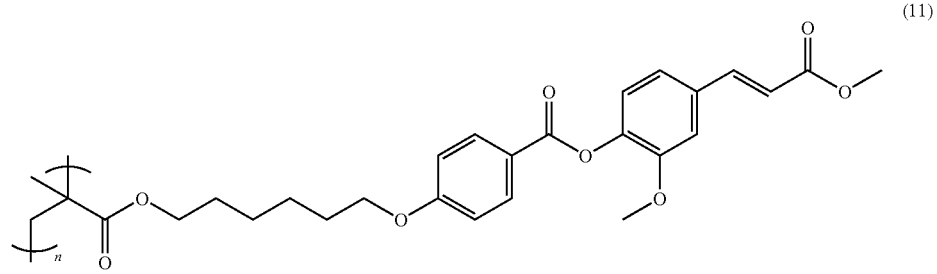

(11)

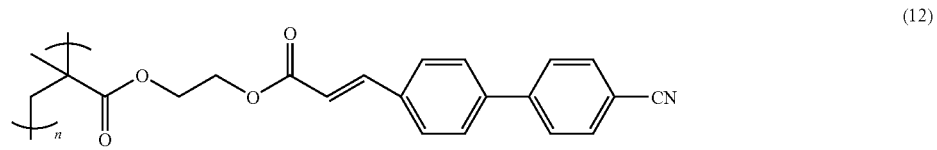

(12)

As the photo-dimerization-reactive compound, a photo dimerization-reactive site or substituent can be variously selected as the photo-dimerization-reactive compound from the above-mentioned compounds in accordance with required properties. One kind of the photo-dimerization-reactive compound may be used alone or a combination of two or more kinds thereof can be used.

The photo-dimerization type material may contain additives besides the above-mentioned photo-dimerization-reactive compound as long as the photoaligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo-dimerization-reactive compound and then use the selected one. The added amount of the polymerization initiator or the polymerization inhibitor is preferably from 0.001% by weight to 20% by weight, more preferably from 0.1% by weight to 5% by weight of the photo-dimerization-reactive compound. If the added amount of the polymerization initiator or the polymerization inhibitor is too small, the polymerization may not be initiated (or inhibited). Conversely, if the amount is too large, the reaction may be hindered.

The wavelength range of the radiated light with which the photo-dimerization type material generates a photo-dimerization reaction is preferably in the range of ultraviolet ray wavelengths, that is, the range of 10 nm to 400 nm, more preferably the range of 250 nm to 380 nm.

Next, the photo alignment treatment method will be explained. First, a second alignment layer-forming coating solution prepared by diluting the above-mentioned photo-dimerization type material with an organic solvent is coated onto the second electrode layer, and dried.

The content of the photo-dimerization-reactive compound in the second alignment layer-forming coating solution is preferably in a range of 0.05% by weight to 10% by weight, and it is more preferably in a range of 0.2% by weight to 2% by weight. In the case the content is fewer than the range, it is difficult to impart the appropriate anisotropy to the alignment layer. Conversely, if the content is more than the range, a homogeneous coating layer can hardly be formed due to the high viscosity of the coating solution.

As an example of the coating method of the second alignment layer-forming coating solution is a spin coating, a roll coating, a rod bar coating, a spray coating, an air knife coating, a slot die coating, a wire bar coating, an ink jet coating, a flexo printing or a screen printing.

The thickness of the layer obtained by coating the second alignment layer-forming coating solution is preferably from 1 nm to 1000 nm, more preferably from 3 nm to 100 nm. If the thickness of the layer is thinner than the range, a sufficient photoaligning may not be obtained. Conversely, if the thickness is thicker than the range, resulting costs may not be preferred.

The resultant layer causes photo-dimerization reaction by the light irradiation the polarization of which is controlled, whereby anisotropy can be imparted. The wavelength range of the radiated light should be appropriately selected in accordance with the constituent material of the used photo alignment layer, and is preferably in the range of ultraviolet ray wavelengths, that is, the range of 100 nm to 400 nm, more preferably the range of 250 nm to 380 nm. The polarizing direction is not particularly limited as long as it can generate the photo-dimerization reaction.

4. Other Structure

The liquid crystal display of the present invention may comprise a polarizing plate as exemplified in FIG. 7. The polarizing plate used in the present invention is not particularly limited as long as it allows transmission only in a specific direction out of the wave motions of a light beam, and thus one commonly used as a polarizing plate for liquid crystal displays can be used.

5. Method for Driving the Liquid Crystal Display

The liquid crystal display of the present invention can make use of the high speed response properties of the ferroelectric liquid crystal. The display is therefore suitable for being displayed by a field sequential color system, in which each pixel is subjected to time sharing and high speed response properties is in particular required in order to obtain good moving image display properties. As mentioned, problems in the case of displaying the liquid crystal display by a field sequential color system can be avoided.

The method for driving the liquid crystal display of the invention is not limited to any field sequential method, and may be a color filer method in which color display is attained by using the colored layer.

The liquid crystal display of the invention is preferably driven by an active matrix system using the thin film transistor (TFT). The adoption of the active matrix system using TFT makes it possible to attain high-quality display since target pixels can be certainly lighted on or off.

In the present invention, the first alignment treatment substrate may be the TFT substrate and the second alignment treatment substrate may be the common electrode substrate, or the first alignment treatment substrate may be the common electrode substrate and the second alignment treatment substrate may be the TFT substrate. Particularly, it is preferable that the first alignment treatment substrate be the TFT substrate and the second alignment treatment substrate be the common electrode substrate.

In the liquid crystal display shown in FIG. 9, for example, the switch of the TFT element is ON when the gate electrode 24x is made to have a potential as high as about 30V, whereby signal voltage is applied to the ferroelectric liquid crystal by the source electrode 24y, and when the potential of the gate electrode 24y is made to drop to a potential as low as −10V, the switch of the TFT element 25 is OFF. In the switch-off state, voltage is applied across the common electrode (second electrode layer) 14 and the gate electrode 24x in such a manner that the common electrode (second electrode layer) 14 side is made positive as illustrated in FIG. 10. In this switch-off state, the ferroelectric liquid crystal is not made to work and therefore, its pixel is put into a dark state.

In the present invention, the direction of the spontaneous polarization of the liquid crystal molecule tends to direct toward the first alignment treatment substrate side by a polar surface interaction in a non-voltage applied state. Specifically, in the switch-off state, the direction of the spontaneous polarization Ps of the liquid crystal molecule 1 tends to direct toward the TFT substrate (first alignment treatment substrate) 6 side as illustrated in FIG. 10. Therefore, the direction of the spontaneous polarization is unaffected by the voltage applied across the common electrode (second electrode layer) 14 and the gate electrode 24x.

On the other hand, if the direction of the spontaneous polarization of the liquid crystal molecule tends to direct toward the common electrode substrate (second alignment treatment substrate) side in a non-voltage applied state, the direction of the spontaneous polarization is inverted in the vicinity of the area where the gate electrode is disposed in the switch-off state by the influence of the voltage applied across the common electrode and the gate electrode. Then, the ferroelectric liquid crystal is made to work in the vicinity of the area where the gate electrode is formed though the switch is OFF, and causing light leakage.

In the present invention, as mentioned above, the direction of the spontaneous polarization is not affected by the voltage applied across the common electrode and the gate electrode and therefore, no light leakage is caused. Therefore, in the present invention, the direction of the spontaneous polarization is controlled, the first alignment treatment substrate is used as the TFT substrate and the second alignment treatment substrate is used as the common electrode substrate, whereby light leakage in the vicinity of the gate electrode can be prevented.

As mentioned above, the ferroelectric liquid crystal used in the present invention is a ferroelectric liquid crystal, whose molecular direction is changed by about 2 times a tilt angle of the ferroelectric liquid crystal parallel to a surface of the first alignment treatment substrate when a negative voltage is applied to the second electrode layer.

Suppose that the case where the voltage of the pixel electrode is relatively high is defined as the case plus-polarized voltage is applied, whereas the case where the voltage of the pixel electrode is relatively low is defined as the case where minus-polarized voltage is applied. The definition like this allows the following explanations as to the present invention. Specifically, when the first alignment treatment substrate is the common electrode substrate and the second alignment treatment substrate is the TFT substrate, the ferroelectric liquid crystal varies in its molecular direction about twice the tilt angle of the ferroelectric liquid crystal in parallel to the surface of the first alignment treatment substrate when the voltage of the pixel electrode is relatively lower than that of the common electrode, that is, in the case where minus-polarized voltage is applied. When the first alignment treatment substrate is the TFT substrate and the second alignment treatment substrate is the common electrode substrate, the ferroelectric liquid crystal varies in its molecular direction about twice the tilt angle of the ferroelectric liquid crystal in parallel to the surface of the first alignment treatment substrate when the voltage of the pixel electrode is relatively higher than that of the common electrode, that is, in the case where plus-polarized voltage is applied.

The liquid crystal display of the present invention may be driven in a segment mode.

6. Process for Producing the Liquid Crystal Display

Next, a process for producing the liquid crystal display of the invention is described. The liquid crystal display of the invention can be produced by a method used ordinarily as a liquid crystal display producing process such as a vacuum injection method or One Drop Fill method.

Hereinafter, a manufacturing method of the liquid crystal display driven by an active matrix system using a TFT element will be described as an example of the producing method of liquid crystal display of the present invention.

In the vacuum injection method, first, a transparent electroconductive film is formed on a second substrate by vacuum injection method, so as to prepare a full-face common electrode. Furthermore, a photo-dimerization type material is coated onto the common electrode, and the resultant is subjected to photo alignment treatment to form a second alignment layer and to prepare a second alignment treatment substrate. An electroconductive film is patterned into a matrix form on a first substrate, thereby forming gate electrodes and source electrodes. By patterning the transparent electroconductive film, pixel electrodes are formed and TFT elements are then set up thereon. Furthermore, polyimide is coated onto the gate electrodes, the source electrodes, the TFT elements and the pixel electrodes, and then the resultant is subjected to rubbing treatment to form a first alignment layer. In this way, a first alignment treatment substrate is prepared.

Next, beads are dispersed, as spacers, onto the first alignment layer of the first alignment treatment substrate, and then a sealing agent is coated onto the circumference thereof. The first alignment treatment substrate and the second alignment treatment substrate are provided such that the direction of alignment treatment of the respective first alignment layer and the second alignment layer becomes substantially perpendicular to each other and adhered. The substrates are then thermally compressed. A capillary effect is used to inject a ferroelectric liquid crystal, in an isotropic liquid state, into an injecting opening therein. The injecting opening is sealed up with an ultraviolet curing resin or the like. Thereafter, the ferroelectric liquid crystal is slowly cooled so as to be aligned.

In the One Drop Fill method, first, a transparent electroconductive film is formed on a second substrate by a vacuum injection method, so as to prepare a full-face common electrode. Partition walls are formed in pattern on the common electrode layer by a photolithography method. Furthermore, a photo-dimerization type material is coated onto the common electrode and the partition walls, and the resultant is subjected to photo alignment treatment to form a second alignment layer and to prepare a second alignment treatment substrate. An electroconductive film is patterned into a matrix form on a first substrate, thereby forming gate electrodes and source electrodes. By patterning the transparent electroconductive film, pixel electrodes are formed and TFT elements are then set up thereon. Furthermore, polyimide is coated onto the gate electrodes, the source electrodes, the TFT elements and the pixel electrodes, and then the resultant is subjected to rubbing treatment to form a first alignment layer. In this way, a first alignment treatment substrate is prepared.

Next, ferroelectric liquid crystals in an isotopic state are discharged onto the second alignment layer of the second alignment treatment substrate by an ink jet method. A sealing agent is coated to the circumference of the first alignment treatment substrate. The first alignment treatment substrate and the second alignment treatment substrate are subsequently heated to a temperature where the ferroelectric liquid crystals exhibit a nematic phase or an isotropic phase. The two substrates are provided such that the direction of alignment treatment of the first alignment layer and the second alignment layer of the respective substrates becomes substantially parallel to each other, and they are superimposed and adhered via a sealing agent. The liquid crystal cell is slowly cooled down to room temperature and sealed ferroelectric liquid crystals are thereby aligned.

In aligning the ferroelectric liquid crystal, if the polymerizable monomer is added thereto, the polymerizable monomer is polymerized after the alignment of the ferroelectric liquid crystal. A polymerization method of the polymerizable monomer is appropriately selected in accordance with the kind of the polymerizable monomer. For example, when an ultraviolet curable resin monomer is used as the polymerizable monomer, the polymerizable monomer can be polymerized by irradiation an UV.

Further, in polymerizing the polymerizable monomer, voltage may or may not be applied to the liquid crystal layer constituted by the ferroelectric liquid crystal. It is preferable to polymerize the polymerizable monomer without applying a voltage to the liquid crystal layer.

Polarizing plates may be adhered to the top and bottom of the liquid crystal cell obtained as the above.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

The invention will be described in more detail by way of the following working examples and comparative examples.

Example 1

Two glass substrates each of which has an ITO electrode formed were washed well. A 2% by mass solution of a photo-dimerization type material (manufactured by Rolic Technologies Ltd., trade name: ROP 103) in cyclopentanone was spin-coated, at a rotation number of 1500 rpm for 15 seconds, onto one of the glass substrate. The resultants were dried at 130° C. for 15 minutes, and were then exposed to polarized ultraviolet rays at about 100 mJ/cm$^2$ to conduct an alignment treatment. Polyimide (manufactured by NISSAN CHEMICAL INDUSTRIES, LTD., trade name: SE-5291) was printed onto the other glass substrate and rubbing treated to form an alignment layer.

Bead spacers 1.5 μm in size were scattered onto one of the substrates and s sealing material was coated onto the other substrate with a seal dispenser. The substrates were provided to face each other so that the direction of the respective alignment treatment becomes parallel to each other, and then the substrates were thermally compressed onto each other to manufacture an empty liquid crystal cell.

A ferroelectric liquid crystal (manufactured by AZ Electronic Materials, trade name "R2301") was caused to adhere onto the upper part of the injecting opening. An oven was used to inject the liquid crystal at a temperature higher than the nematic phase N phase/isotropic phase transition temperature by 10 to 20° C., and the temperature was slowly returned to room temperature.

Double domain ratio in the panel of the obtained liquid crystal display was about 83:17. When a negative voltage was applied to the electrode of the substrate where the photo alignment layer using the photo-dimerization type material is formed, a molecular direction of the ferroelectric liquid crystals was changed by about 2 times a tilt angle of the ferroelectric liquid crystal parallel to a surface of the substrate in about 83% of the panel region.

Example 2

Two glass substrates each of which has an ITO electrode formed were washed well. A 2% by mass solution of a photo-dimerization type material (manufactured by Rolic Technologies Ltd., trade name: ROP 103) in cyclopentanone was spin-coated, at a rotation number of 1500 rpm for 15 seconds, onto one of the glass substrate. The resultants were dried at 130° C. for 15 minutes, and were then exposed to polarized ultraviolet rays at about 100 mJ/cm$^2$ to conduct an alignment treatment. Polyimide (manufactured by NISSAN CHEMICAL INDUSTRIES, LTD., trade name: SE-7992) was printed onto the other glass substrate and rubbing treated to form an alignment layer.

Bead spacers 1.5 μm in size were scattered onto one of the substrates and s sealing material was coated onto the other substrate with a seal dispenser. The substrates were provided to face each other so that the direction of the respective alignment treatment becomes parallel to each other, and then the substrates were thermally compressed onto each other to manufacture an empty liquid crystal cell.

A ferroelectric liquid crystal (manufactured by AZ Electronic Materials, trade name "R2301") was caused to adhere onto the upper part of the injecting opening. An oven was used to inject the liquid crystal at a temperature higher than the nematic phase N phase/isotropic phase transition temperature by 10 to 20° C., and the temperature was slowly returned to room temperature.

Double domain ratio in the panel of the obtained liquid crystal display was about 92:8. When a negative voltage was applied to the electrode of the substrate where the photo alignment layer using the photo-dimerization type material is formed, a molecular direction of the ferroelectric liquid crystals was changed by about 2 times a tilt angle of the ferroelectric liquid crystal parallel to a surface of the substrate in about 92% of the panel region.

Comparative Example 1

Two glass substrates each of which has an ITO electrode formed were washed well. A 2% by mass solution of a photo-dimerization type material (manufactured by Rolic Technologies Ltd., trade name: ROP 103) in cyclopentanone was spin-coated, at a rotation number of 1500 rpm for 15 seconds, onto each of the two glass substrate. The resultants were dried at 130° C. for 15 minutes, and were then exposed to polarized ultraviolet rays at about 100 mJ/cm$^2$ to conduct an alignment treatment respectively.

Bead spacers 1.5 μm in size were scattered onto one of the substrates and s sealing material was coated onto the other substrate with a seal dispenser. The substrates were provided to face each other so that the direction of the respective alignment treatment becomes parallel to each other, and then the substrates were thermally compressed onto each other to manufacture an empty liquid crystal cell.

A ferroelectric liquid crystal (manufactured by AZ Electronic Materials, trade name "R2301") was caused to adhere onto the upper part of the injecting opening. An oven was used to inject the liquid crystal at a temperature higher than the nematic phase N phase/isotropic phase transition temperature by 10 to 20° C., and the temperature was slowly returned to room temperature.

Double domain ratio in the panel of the obtained liquid crystal display was about 50:50. When a negative voltage was applied to the electrode of one of the substrates, a molecular direction of the ferroelectric liquid crystals was changed by about 2 times a tilt angle of the ferroelectric liquid crystal parallel to a surface of the substrate in about 50% of the panel region.

Comparative Example 2

Two glass substrates each of which has an ITO electrode formed were washed well. Polyimide (manufactured by NISSAN CHEMICAL INDUSTRIES, LTD., trade name: SE-5291) was printed onto the two glass substrates and rubbing treated to form an alignment layer respectively.

Bead spacers 1.5 μm in size were scattered onto one of the substrates and a sealing material was coated onto the other substrate with a seal dispenser. The substrates were provided to face each other so that the direction of the respective alignment treatment becomes parallel to each other, and then the substrates were thermally compressed onto each other to manufacture an empty liquid crystal cell.

A ferroelectric liquid crystal (manufactured by AZ Electronic Materials, trade name "R2301") was caused to adhere onto the upper part of the injecting opening. An oven was used to inject the liquid crystal at a temperature higher than the nematic phase (N phase)/isotropic phase transition temperature by 10 to 20° C., and the temperature was slowly returned to room temperature.

Double domain ratio in the panel of the obtained liquid crystal display was about 50:50. When a negative voltage was applied to the electrode of one of the substrates, a molecular direction of the ferroelectric liquid crystals was changed by about 2 times a tilt angle of the ferroelectric liquid crystal parallel to a surface of the substrate in about 50% of the panel region.

The invention claimed is:

1. A liquid crystal display comprising:
   a first alignment treatment substrate having a first substrate, a first electrode layer formed on the first substrate, and a first alignment layer which is formed on the first electrode layer and which is a rubbed layer; and
   a second alignment treatment substrate having a second substrate, a second electrode layer formed on the second substrate, a second alignment layer which is formed on the second electrode layer and which is a photo alignment layer using a photo-dimerization type material to exhibit anisotropy to an alignment layer by generating a photo-dimerization reaction; and
   a ferroelectric liquid crystal held between the first alignment layer of the first alignment treatment substrate and the second alignment layer of the second alignment treatment substrate;
   in which the first alignment layer of the first alignment treatment substrate and the second alignment layer of the second alignment treatment substrate are provided to face each other, wherein the ferroelectric liquid crystal exhibits mono-stability, and
   further wherein, when a negative voltage is applied to the second electrode layer, a molecular direction of the ferroelectric liquid crystal is changed by about 2 times a tilt angle of the ferroelectric liquid crystal parallel to a surface of the first alignment treatment substrate.

2. The liquid crystal display according to claim 1, wherein the rubbed layer contains polyimide.

3. The liquid crystal display according to claim 1, wherein the first alignment treatment substrate is a TFT substrate having a thin film transistor (TFT) formed on the first substrate, and the second alignment treatment substrate is a common electrode substrate in which the second electrode layer is a common electrode.

4. The liquid crystal display according to claim 1, wherein the liquid crystal display is driven by an active matrix system using the thin film transistor.

5. The liquid crystal display according to claim 1, wherein the liquid crystal display is displayed by a field sequential color system.

* * * * *